US007925535B2

(12) United States Patent
Beenau et al.

(10) Patent No.: US 7,925,535 B2
(45) Date of Patent: Apr. 12, 2011

(54) SYSTEM AND METHOD FOR SECURING RF TRANSACTIONS USING A RADIO FREQUENCY IDENTIFICATION DEVICE INCLUDING A RANDOM NUMBER GENERATOR

(75) Inventors: Blayn W. Beenau, Peoria, AZ (US); Seth W. Fields, Taylorsville, UT (US); Jon Imada, Mesa, AZ (US); John McDonald, Eugene, OR (US); Lee J. Peart, Epson (GB); John Rojewski, Glendale, AZ (US); Peter D. Saunders, Salt Lake City, UT (US)

(73) Assignee: American Express Travel Related Services Company, Inc., New York, NY (US)

( * ) Notice: Subject to any disclaimer, the term of this patent is extended or adjusted under 35 U.S.C. 154(b) by 913 days.

(21) Appl. No.: 10/708,547

(22) Filed: Mar. 10, 2004

(65) Prior Publication Data

US 2005/0071231 A1    Mar. 31, 2005

Related U.S. Application Data

(63) Continuation-in-part of application No. 10/192,488, filed on Jul. 9, 2002, now Pat. No. 7,239,226, and a continuation-in-part of application No. 10/340,352, filed on Jan. 10, 2003.

(60) Provisional application No. 60/304,216, filed on Jul. 10, 2001, provisional application No. 60/396,577, filed on Jul. 16, 2002, provisional application No. 60/507,803, filed on Sep. 30, 2003.

(51) Int. Cl.
*G06Q 20/00*    (2006.01)

(52) U.S. Cl. .................... 705/16; 705/14.64; 705/14.65; 705/18; 705/67; 235/462.47

(58) Field of Classification Search .................. None
See application file for complete search history.

(56) References Cited

U.S. PATENT DOCUMENTS

| 4,268,715 | A | * | 5/1981 | Atalla ........................... 705/75 |
| 4,303,904 | A | | 12/1981 | Chasek |
| 4,443,027 | A | | 4/1984 | McNeely et al. |
| 4,450,535 | A | | 5/1984 | de Pommery et al. |

(Continued)

FOREIGN PATENT DOCUMENTS

CH    689070    8/1988

(Continued)

OTHER PUBLICATIONS

International Search Report and Written Opinion of the International Searching Authority, PCT/US05/26067, May 23, 2007.

(Continued)

*Primary Examiner* — F. Zeender
*Assistant Examiner* — Luna Champagne
(74) *Attorney, Agent, or Firm* — Snell & Wilmer L.L.P.

(57) ABSTRACT

A system and method for securing a Radio Frequency (RF) transaction using a RF identification device (RFID) transaction device is provided. The method includes a RFID transaction device including a random number generator for generating a random number. The random number may be used by an account issuer to verify the validity of a RFID transaction device or RFID reader communicating on the RF transaction network. The authorizing agent may receive the random number and compare the random number to a device validating code.

19 Claims, 4 Drawing Sheets

U.S. PATENT DOCUMENTS

| | | |
|---|---|---|
| 4,475,308 A | 10/1984 | Heise et al. |
| 4,583,766 A | 4/1986 | Wessel |
| 4,639,765 A | 1/1987 | d'Hont |
| 4,672,021 A | 6/1987 | Blumel et al. |
| 4,700,055 A | 10/1987 | Kashkashian, Jr. |
| 4,736,094 A | 4/1988 | Yoshida |
| 4,739,328 A | 4/1988 | Koelle et al. |
| 4,837,422 A | 6/1989 | Dethloff et al. |
| 4,839,504 A | 6/1989 | Nakano |
| 4,868,849 A | 9/1989 | Tamaoki |
| 4,961,142 A | 10/1990 | Elliott et al. |
| 5,016,274 A | 5/1991 | Micali et al. |
| 5,023,782 A | 6/1991 | Lutz et al. |
| 5,023,908 A | 6/1991 | Weiss |
| 5,025,372 A | 6/1991 | Burton et al. |
| 5,053,774 A | 10/1991 | Schuermann et al. |
| 5,099,226 A | 3/1992 | Andrews |
| 5,101,200 A | 3/1992 | Swett |
| 5,197,140 A | 3/1993 | Balmer |
| 5,202,826 A | 4/1993 | McCarthy |
| 5,212,777 A | 5/1993 | Gove et al. |
| 5,221,838 A | 6/1993 | Gutman et al. |
| 5,222,282 A | 6/1993 | Sukonnik et al. |
| 5,226,989 A | 7/1993 | Sukonnik |
| 5,239,654 A | 8/1993 | Ing-Simmons et al. |
| 5,247,304 A | 9/1993 | d'Hont |
| 5,274,392 A | 12/1993 | d'Hont et al. |
| 5,276,311 A | 1/1994 | Hennige |
| 5,285,100 A | 2/1994 | Byatt |
| 5,305,002 A | 4/1994 | Holodak et al. |
| 5,326,964 A | 7/1994 | Risser |
| 5,329,617 A | 7/1994 | Asal |
| 5,331,138 A | 7/1994 | Saroya |
| 5,339,447 A | 8/1994 | Balmer |
| 5,349,357 A | 9/1994 | Schurmann et al. |
| 5,350,906 A | 9/1994 | D'Hont et al. |
| 5,351,052 A | 9/1994 | d'Hont et al. |
| 5,365,551 A * | 11/1994 | Snodgrass et al. ............. 375/141 |
| 5,371,896 A | 12/1994 | Gove et al. |
| 5,373,303 A | 12/1994 | d'Hont |
| 5,397,881 A | 3/1995 | Mannik |
| 5,407,893 A | 4/1995 | Koshizuka et al. |
| 5,408,243 A | 4/1995 | d'Hont |
| 5,410,649 A | 4/1995 | Gove |
| 5,428,363 A | 6/1995 | d'Hont |
| 5,453,601 A | 9/1995 | D'Hont et al. |
| 5,453,747 A | 9/1995 | d'Hont et al. |
| 5,461,217 A | 10/1995 | Claus |
| 5,471,592 A | 11/1995 | Gove et al. |
| 5,485,510 A | 1/1996 | Colbert |
| 5,488,376 A | 1/1996 | Hurta et al. |
| 5,489,411 A | 2/1996 | Jha et al. |
| 5,489,908 A | 2/1996 | Orthmann et al. |
| 5,490,079 A | 2/1996 | Sharpe et al. |
| 5,491,483 A | 2/1996 | d'Hont |
| 5,491,484 A | 2/1996 | Schuermann |
| 5,491,715 A | 2/1996 | Flaxl |
| 5,493,312 A | 2/1996 | Knebelkamp |
| 5,497,121 A | 3/1996 | d'Hont |
| 5,500,513 A | 3/1996 | Langhans et al. |
| 5,500,651 A | 3/1996 | Schuermann |
| 5,513,525 A | 5/1996 | Schurmann |
| 5,519,381 A | 5/1996 | Marsh et al. |
| 5,522,083 A | 5/1996 | Gove et al. |
| 5,525,992 A | 6/1996 | Froschermeier |
| 5,525,994 A | 6/1996 | Hurta et al. |
| 5,530,232 A | 6/1996 | Taylor |
| 5,537,314 A | 7/1996 | Kanter |
| 5,541,604 A | 7/1996 | Meier |
| 5,543,798 A | 8/1996 | Schuermann |
| 5,544,246 A | 8/1996 | Mandelbaum et al. |
| 5,548,291 A | 8/1996 | Meier et al. |
| 5,550,536 A | 8/1996 | Flaxl |
| 5,550,548 A | 8/1996 | Schuermann |
| 5,552,789 A | 9/1996 | Schuermann |
| 5,557,279 A | 9/1996 | d'Hont |
| 5,557,516 A | 9/1996 | Hogan |
| 5,561,430 A | 10/1996 | Knebelkamp |
| 5,563,582 A | 10/1996 | d'Hont |
| 5,569,187 A | 10/1996 | Kaiser |
| 5,572,226 A | 11/1996 | Tuttle |
| 5,577,109 A | 11/1996 | Stimson et al. |
| 5,577,120 A | 11/1996 | Penzias |
| 5,578,808 A | 11/1996 | Taylor |
| 5,581,630 A | 12/1996 | Bonneau, Jr. |
| 5,585,787 A | 12/1996 | Wallerstein |
| 5,590,038 A | 12/1996 | Pitroda |
| 5,592,150 A | 1/1997 | d'Hont |
| 5,592,405 A | 1/1997 | Gove et al. |
| 5,594,227 A | 1/1997 | Deo |
| 5,594,233 A | 1/1997 | Kenneth et al. |
| 5,594,448 A | 1/1997 | d'Hont |
| 5,597,534 A | 1/1997 | Kaiser |
| 5,600,175 A | 2/1997 | Orthmann |
| 5,602,538 A | 2/1997 | Orthmann et al. |
| 5,602,919 A | 2/1997 | Hurta et al. |
| 5,604,342 A | 2/1997 | Fujioka |
| 5,606,520 A | 2/1997 | Gove et al. |
| 5,606,594 A | 2/1997 | Register et al. |
| 5,607,522 A | 3/1997 | McDonnell |
| 5,608,406 A | 3/1997 | Eberth et al. |
| 5,608,778 A | 3/1997 | Partridge, III |
| 5,613,146 A | 3/1997 | Gove et al. |
| 5,614,703 A | 3/1997 | Martin et al. |
| 5,619,207 A | 4/1997 | d'Hont |
| 5,621,396 A | 4/1997 | Flaxl |
| 5,621,411 A | 4/1997 | Hagl et al. |
| 5,621,412 A | 4/1997 | Sharpe et al. |
| 5,625,366 A | 4/1997 | d'Hont |
| 5,625,370 A | 4/1997 | d'Hont |
| 5,625,695 A | 4/1997 | M'Raihi et al. |
| 5,629,981 A | 5/1997 | Nerlikar |
| 5,638,080 A | 6/1997 | Orthmann et al. |
| 5,640,002 A | 6/1997 | Ruppert et al. |
| 5,641,050 A | 6/1997 | Smith et al. |
| 5,646,607 A | 7/1997 | Schurmann et al. |
| 5,649,118 A | 7/1997 | Carlisle |
| 5,657,388 A | 8/1997 | Weiss |
| 5,660,319 A | 8/1997 | Falcone et al. |
| 5,673,106 A | 9/1997 | Thompson |
| 5,675,342 A | 10/1997 | Sharpe |
| 5,686,920 A | 11/1997 | Hurta et al. |
| 5,689,100 A | 11/1997 | Carrithers |
| 5,691,731 A | 11/1997 | vanErven |
| 5,692,132 A | 11/1997 | Hogan |
| 5,696,913 A | 12/1997 | Gove et al. |
| 5,698,837 A | 12/1997 | Furuta |
| 5,699,528 A | 12/1997 | Hogan |
| 5,701,127 A | 12/1997 | Sharpe |
| 5,704,046 A | 12/1997 | Hogan |
| 5,705,798 A | 1/1998 | Tarbox |
| 5,715,399 A | 2/1998 | Bezos |
| 5,721,781 A | 2/1998 | Deo et al. |
| 5,724,424 A | 3/1998 | Gifford |
| 5,729,053 A | 3/1998 | Orthmann |
| 5,729,236 A | 3/1998 | Flaxl |
| 5,731,957 A | 3/1998 | Brennan |
| 5,732,579 A | 3/1998 | d'Hont et al. |
| 5,734,838 A | 3/1998 | Robinson et al. |
| 5,742,756 A | 4/1998 | Dillaway et al. |
| 5,742,845 A | 4/1998 | Wagner |
| 5,748,137 A | 5/1998 | d'Hont |
| 5,748,737 A | 5/1998 | Daggar |
| 5,758,195 A | 5/1998 | Balmer |
| 5,761,306 A | 6/1998 | Lewis |
| 5,761,493 A | 6/1998 | Blakeley et al. |
| 5,768,385 A | 6/1998 | Simon |
| 5,768,609 A | 6/1998 | Gove et al. |
| 5,770,843 A | 6/1998 | Rose |
| 5,774,882 A | 6/1998 | Keen et al. |
| 5,777,903 A | 7/1998 | Piosenka |
| 5,778,067 A | 7/1998 | Jones et al. |
| 5,778,069 A | 7/1998 | Thomlinson |
| 5,785,680 A | 7/1998 | Niezink et al. |
| 5,792,337 A | 8/1998 | Padovani et al. |
| 5,793,324 A | 8/1998 | Aslanidis et al. |
| 5,794,095 A | 8/1998 | Thompson |

| Patent | Date | Inventor |
|---|---|---|
| 5,797,060 A | 8/1998 | Thompson |
| 5,797,085 A | 8/1998 | Buek et al. |
| 5,797,133 A | 8/1998 | Jones et al. |
| 5,798,709 A | 8/1998 | Flaxl |
| 5,809,142 A | 9/1998 | Hurta et al. |
| 5,809,288 A | 9/1998 | Balmer |
| 5,809,633 A | 9/1998 | Mundigl et al. |
| 5,825,007 A | 10/1998 | Jesadanont |
| 5,825,302 A | 10/1998 | Stafford |
| 5,826,077 A | 10/1998 | Blakeley et al. |
| 5,826,241 A | 10/1998 | Stein |
| 5,826,242 A | 10/1998 | Montulli |
| 5,826,243 A | 10/1998 | Musmanno et al. |
| 5,828,044 A | 10/1998 | Jun et al. |
| 5,834,756 A | 11/1998 | Gutman et al. |
| 5,835,894 A | 11/1998 | Adcock et al. |
| 5,841,364 A | 11/1998 | Hagl et al. |
| 5,842,088 A | 11/1998 | Thompson |
| 5,844,218 A | 12/1998 | Kawan et al. |
| 5,844,230 A | 12/1998 | Lalonde |
| 5,845,267 A | 12/1998 | Ronen |
| 5,851,149 A | 12/1998 | Xidos et al. |
| 5,852,812 A | 12/1998 | Reeder |
| 5,854,891 A | 12/1998 | Postlewaite et al. |
| 5,858,006 A | 1/1999 | Van der Aa et al. |
| 5,859,419 A | 1/1999 | Wynn |
| 5,859,779 A | 1/1999 | Giordano et al. |
| 5,862,325 A | 1/1999 | Reed et al. |
| 5,864,306 A | 1/1999 | Dwyer et al. |
| 5,864,323 A | 1/1999 | Berthon |
| 5,864,830 A | 1/1999 | Armetta et al. |
| 5,867,100 A | 2/1999 | d'Hont |
| 5,870,031 A | 2/1999 | Kaiser et al. |
| 5,870,915 A | 2/1999 | d'Hont |
| 5,878,138 A | 3/1999 | Yacobi |
| 5,878,141 A | 3/1999 | Daly et al. |
| 5,878,215 A | 3/1999 | Kling et al. |
| 5,878,337 A | 3/1999 | Joao et al. |
| 5,878,403 A | 3/1999 | DeFrancesco et al. |
| 5,880,675 A | 3/1999 | Trautner |
| 5,881,272 A | 3/1999 | Balmer |
| 5,883,810 A | 3/1999 | Franklin et al. |
| 5,884,280 A | 3/1999 | Yoshioka et al. |
| 5,887,266 A | 3/1999 | Heinonen et al. |
| 5,890,137 A | 3/1999 | Koreeda |
| 5,897,622 A | 4/1999 | Blinn et al. |
| 5,898,783 A | 4/1999 | Rohrbach |
| 5,898,838 A | 4/1999 | Wagner |
| 5,903,830 A | 5/1999 | Joao et al. |
| 5,903,875 A | 5/1999 | Kohara |
| 5,903,880 A | 5/1999 | Biffar |
| 5,905,798 A | 5/1999 | Nerlikar et al. |
| 5,905,908 A | 5/1999 | Wagner |
| 5,909,492 A | 6/1999 | Payne et al. |
| 5,912,678 A | 6/1999 | Saxena et al. |
| 5,913,203 A | 6/1999 | Wong et al. |
| 5,914,472 A | 6/1999 | Foladare et al. |
| 5,915,023 A | 6/1999 | Bernstein |
| 5,917,168 A | 6/1999 | Nakamura et al. |
| 5,918,216 A | 6/1999 | Miksovsky et al. |
| 5,920,628 A | 7/1999 | Indeck et al. |
| 5,923,734 A | 7/1999 | Taskett |
| 5,929,801 A | 7/1999 | Aslanidis et al. |
| 5,930,767 A | 7/1999 | Reber et al. |
| 5,930,777 A | 7/1999 | Barber |
| 5,931,917 A | 8/1999 | Nguyen et al. |
| 5,933,624 A | 8/1999 | Balmer |
| 5,943,624 A | 8/1999 | Fox et al. |
| 5,948,116 A | 9/1999 | Aslanidis et al. |
| 5,949,044 A | 9/1999 | Walker et al. |
| 5,949,876 A | 9/1999 | Ginter et al. |
| 5,953,512 A | 9/1999 | Cai et al. |
| 5,953,710 A | 9/1999 | Fleming |
| 5,955,717 A | 9/1999 | Vanstone |
| 5,955,969 A | 9/1999 | d'Hont |
| 5,956,024 A | 9/1999 | Strickland et al. |
| 5,956,699 A | 9/1999 | Wong et al. |
| 5,958,004 A | 9/1999 | Helland et al. |
| 5,960,411 A | 9/1999 | Hartman et al. |
| 5,963,915 A | 10/1999 | Kirsch |
| 5,963,924 A | 10/1999 | Williams et al. |
| 5,966,697 A | 10/1999 | Fergerson et al. |
| 5,970,148 A | 10/1999 | Meier |
| 5,970,471 A | 10/1999 | Hill |
| 5,970,472 A | 10/1999 | Allsop et al. |
| 5,970,473 A | 10/1999 | Gerszberg et al. |
| 5,970,475 A | 10/1999 | Barnes et al. |
| RE36,365 E | 11/1999 | Levine et al. |
| 5,978,840 A | 11/1999 | Nguyen et al. |
| 5,979,757 A | 11/1999 | Tracy et al. |
| 5,982,293 A | 11/1999 | Everett et al. |
| 5,983,207 A | 11/1999 | Turk et al. |
| 5,983,208 A | 11/1999 | Haller |
| 5,984,180 A | 11/1999 | Albrecht |
| 5,987,140 A | 11/1999 | Rowney et al. |
| 5,987,155 A | 11/1999 | Dunn et al. |
| 5,987,498 A | 11/1999 | Athing et al. |
| 5,989,950 A | 11/1999 | Wu |
| 5,991,413 A | 11/1999 | Arditti et al. |
| 5,991,608 A | 11/1999 | Leyten |
| 5,991,748 A | 11/1999 | Taskett |
| 5,991,750 A | 11/1999 | Watson |
| 5,996,076 A | 11/1999 | Rowney et al. |
| 5,999,914 A | 12/1999 | Blinn et al. |
| 6,000,832 A | 12/1999 | Franklin et al. |
| 6,002,438 A | 12/1999 | Hocevar et al. |
| 6,002,767 A | 12/1999 | Kramer |
| 6,003,014 A | 12/1999 | Lee et al. |
| 6,005,942 A | 12/1999 | Chan et al. |
| 6,006,216 A | 12/1999 | Griffin et al. |
| 6,009,412 A | 12/1999 | Storey |
| 6,011,487 A | 1/2000 | Plocher |
| 6,012,039 A | 1/2000 | Hoffman et al. |
| 6,012,049 A | 1/2000 | Kawan |
| 6,012,143 A | 1/2000 | Tanaka |
| 6,012,636 A | 1/2000 | Smith |
| 6,014,634 A | 1/2000 | Scroggie et al. |
| 6,014,635 A | 1/2000 | Harris et al. |
| 6,014,636 A | 1/2000 | Reeder |
| 6,014,645 A | 1/2000 | Cunningham |
| 6,014,646 A | 1/2000 | Vallee et al. |
| 6,014,648 A | 1/2000 | Brennan |
| 6,014,650 A | 1/2000 | Zampese |
| 6,014,748 A | 1/2000 | Tushi et al. |
| 6,016,482 A | 1/2000 | Molinari et al. |
| 6,016,484 A | 1/2000 | Williams et al. |
| 6,018,717 A | 1/2000 | Lee et al. |
| 6,018,718 A | 1/2000 | Walker et al. |
| 6,021,943 A | 2/2000 | Chastain |
| 6,023,510 A | 2/2000 | Epstein |
| 6,024,286 A | 2/2000 | Bradley et al. |
| 6,029,147 A | 2/2000 | Horadan et al. |
| 6,029,149 A | 2/2000 | Dykstra et al. |
| 6,029,150 A | 2/2000 | Kravitz |
| 6,029,890 A | 2/2000 | Austin |
| 6,029,892 A | 2/2000 | Miyake |
| 6,032,136 A | 2/2000 | Brake et al. |
| 6,038,292 A | 3/2000 | Thomas |
| 6,038,551 A | 3/2000 | Barlow et al. |
| 6,038,584 A | 3/2000 | Balmer |
| 6,041,308 A | 3/2000 | Walker et al. |
| 6,044,360 A | 3/2000 | Picciallo |
| 6,047,888 A | 4/2000 | Dethloff |
| 6,052,675 A | 4/2000 | Checchio |
| 6,058,418 A | 5/2000 | Kobata |
| 6,061,344 A * | 5/2000 | Wood, Jr. .................. 370/346 |
| 6,061,789 A | 5/2000 | Hauser et al. |
| 6,064,320 A | 5/2000 | d'Hont et al. |
| 6,064,981 A | 5/2000 | Barni et al. |
| 6,070,003 A | 5/2000 | Gove et al. |
| 6,070,150 A | 5/2000 | Remington et al. |
| 6,070,154 A | 5/2000 | Tavor et al. |
| 6,072,870 A | 6/2000 | Nguyen et al. |
| 6,073,840 A | 6/2000 | Marion |
| 6,076,078 A | 6/2000 | Camp et al. |
| 6,078,888 A | 6/2000 | Johnson, Jr. |
| 6,078,906 A | 6/2000 | Huberman |
| 6,078,908 A | 6/2000 | Schmitz |

| Patent No. | Kind | Date | Name | Class |
|---|---|---|---|---|
| 6,081,790 | A | 6/2000 | Rosen | |
| RE36,788 | E | 7/2000 | Mansvelt et al. | |
| 6,085,168 | A * | 7/2000 | Mori et al. | 705/17 |
| 6,088,683 | A | 7/2000 | Jalili | |
| 6,088,686 | A | 7/2000 | Walker et al. | |
| 6,088,717 | A | 7/2000 | Reed et al. | |
| 6,088,797 | A | 7/2000 | Rosen | |
| 6,092,057 | A | 7/2000 | Zimmerman et al. | |
| 6,092,198 | A | 7/2000 | Lanzy et al. | |
| 6,098,053 | A | 8/2000 | Slater | |
| 6,098,879 | A | 8/2000 | Terranova | |
| 6,101,174 | A | 8/2000 | Langston | |
| 6,102,162 | A | 8/2000 | Teicher | |
| 6,102,672 | A | 8/2000 | Woollenweber | |
| 6,105,008 | A | 8/2000 | Davis et al. | |
| 6,105,013 | A | 8/2000 | Curry et al. | |
| 6,105,865 | A | 8/2000 | Hardesty | |
| 6,108,641 | A | 8/2000 | Kenna et al. | |
| 6,109,525 | A | 8/2000 | Blomqvist et al. | |
| 6,112,152 | A | 8/2000 | Tuttle | |
| 6,112,191 | A | 8/2000 | Burke | |
| 6,115,360 | A | 9/2000 | Quay et al. | |
| 6,115,458 | A | 9/2000 | Taskett | |
| 6,116,423 | A | 9/2000 | Troxtell, Jr. et al. | |
| 6,116,505 | A | 9/2000 | Withrow | |
| 6,118,189 | A | 9/2000 | Flaxl | |
| 6,121,544 | A | 9/2000 | Petsinger | |
| 6,122,625 | A | 9/2000 | Rosen | |
| 6,123,223 | A | 9/2000 | Watkins | |
| 6,125,352 | A | 9/2000 | Franklin et al. | |
| 6,129,274 | A | 10/2000 | Suzuki | |
| 6,133,834 | A | 10/2000 | Eberth et al. | |
| 6,141,651 | A | 10/2000 | Riley et al. | |
| 6,141,752 | A | 10/2000 | Dancs et al. | |
| 6,163,771 | A | 12/2000 | Walker et al. | |
| 6,167,236 | A | 12/2000 | Kaiser et al. | |
| 6,173,269 | B1 | 1/2001 | Sokol et al. | |
| 6,173,272 | B1 | 1/2001 | Thomas et al. | |
| 6,177,860 | B1 | 1/2001 | Cromer et al. | |
| 6,179,205 | B1 | 1/2001 | Sloan | |
| 6,179,206 | B1 | 1/2001 | Matsumori | |
| 6,185,307 | B1 * | 2/2001 | Johnson, Jr. | 380/270 |
| 6,188,994 | B1 | 2/2001 | Egendorf | |
| 6,189,787 | B1 | 2/2001 | Dorf | |
| 6,192,255 | B1 | 2/2001 | Lewis et al. | |
| 6,198,728 | B1 | 3/2001 | Hulyalkar et al. | |
| 6,198,875 | B1 | 3/2001 | Edenson et al. | |
| 6,202,927 | B1 | 3/2001 | Bashan et al. | |
| 6,205,151 | B1 | 3/2001 | Quay et al. | |
| 6,206,293 | B1 | 3/2001 | Gutman et al. | |
| 6,213,390 | B1 | 4/2001 | Oneda | |
| 6,215,437 | B1 | 4/2001 | Schurmann et al. | |
| 6,216,219 | B1 | 4/2001 | Cai et al. | |
| 6,219,439 | B1 | 4/2001 | Burger | |
| 6,220,510 | B1 | 4/2001 | Everett et al. | |
| 6,222,914 | B1 | 4/2001 | McMullin | |
| D442,627 | S | 5/2001 | Webb et al. | |
| D442,629 | S | 5/2001 | Webb et al. | |
| 6,223,984 | B1 | 5/2001 | Renner et al. | |
| 6,226,382 | B1 | 5/2001 | M'Raihi et al. | |
| 6,227,447 | B1 | 5/2001 | Campisano | |
| 6,230,270 | B1 | 5/2001 | Laczko, Sr. | |
| 6,232,917 | B1 | 5/2001 | Baumer et al. | |
| 6,233,683 | B1 | 5/2001 | Chan et al. | |
| 6,237,848 | B1 | 5/2001 | Everett | |
| 6,239,675 | B1 | 5/2001 | Flaxl | |
| 6,240,187 | B1 | 5/2001 | Lewis | |
| 6,248,199 | B1 | 6/2001 | Smulson | |
| 6,257,486 | B1 | 7/2001 | Teicher et al. | |
| 6,259,769 | B1 | 7/2001 | Page | |
| 6,260,026 | B1 | 7/2001 | Tomida et al. | |
| 6,260,088 | B1 | 7/2001 | Gove et al. | |
| 6,263,316 | B1 | 7/2001 | Khan et al. | |
| 6,264,106 | B1 | 7/2001 | Bridgelall | |
| 6,265,963 | B1 * | 7/2001 | Wood, Jr. | 340/10.4 |
| 6,266,754 | B1 | 7/2001 | Laczko, Sr. et al. | |
| 6,267,292 | B1 | 7/2001 | Walker et al. | |
| 6,269,348 | B1 | 7/2001 | Pare et al. | |
| 6,273,335 | B1 | 8/2001 | Sloan | |
| 6,282,522 | B1 | 8/2001 | Davis et al. | |
| D447,515 | S | 9/2001 | Faenza, Jr. et al. | |
| 6,286,763 | B1 | 9/2001 | Reynolds et al. | |
| 6,289,324 | B1 | 9/2001 | Kawan | |
| 6,293,462 | B1 | 9/2001 | Gangi | |
| 6,315,193 | B1 | 11/2001 | Hogan | |
| 6,315,195 | B1 | 11/2001 | Ramachandran | |
| 6,317,721 | B1 | 11/2001 | Hurta et al. | |
| 6,318,636 | B1 | 11/2001 | Reynolds et al. | |
| 6,323,566 | B1 | 11/2001 | Meier | |
| 6,325,285 | B1 | 12/2001 | Baratelli | |
| 6,325,293 | B1 | 12/2001 | Moreno | |
| 6,326,934 | B1 | 12/2001 | Kinzie | |
| 6,327,573 | B1 | 12/2001 | Walker et al. | |
| 6,330,544 | B1 | 12/2001 | Walker et al. | |
| 6,332,193 | B1 | 12/2001 | Glass et al. | |
| 6,336,095 | B1 | 1/2002 | Rosen | |
| 6,342,844 | B1 | 1/2002 | Rozin | |
| 6,353,811 | B1 | 3/2002 | Weissman | |
| 6,364,208 | B1 | 4/2002 | Stanford et al. | |
| 6,367,011 | B1 | 4/2002 | Lee et al. | |
| 6,374,245 | B1 | 4/2002 | Park | |
| 6,377,034 | B1 | 4/2002 | Ivanov | |
| 6,378,073 | B1 * | 4/2002 | Davis et al. | 726/1 |
| 6,388,533 | B2 | 5/2002 | Swoboda | |
| 6,390,375 | B2 | 5/2002 | Kayanakis | |
| 6,400,272 | B1 | 6/2002 | Holtzman et al. | |
| 6,402,026 | B1 | 6/2002 | Schwier | |
| 6,402,028 | B1 | 6/2002 | Graham, Jr. et al. | |
| 6,411,611 | B1 | 6/2002 | Van der Tuijn | |
| 6,415,978 | B1 | 7/2002 | McAllister | |
| 6,422,464 | B1 | 7/2002 | Terranova | |
| 6,424,029 | B1 | 7/2002 | Giesler | |
| RE37,822 | E | 8/2002 | Anthonyson | |
| 6,427,910 | B1 | 8/2002 | Barnes et al. | |
| 6,438,235 | B2 * | 8/2002 | Sims, III | 380/285 |
| 6,439,455 | B1 | 8/2002 | Everett et al. | |
| 6,442,532 | B1 | 8/2002 | Kawan | |
| 6,445,794 | B1 * | 9/2002 | Shefi | 380/46 |
| 6,457,996 | B1 | 10/2002 | Shih | |
| 6,466,804 | B1 | 10/2002 | Pecen et al. | |
| 6,473,500 | B1 | 10/2002 | Risafi et al. | |
| 6,480,100 | B1 | 11/2002 | Frieden et al. | |
| 6,480,101 | B1 | 11/2002 | Kelly et al. | |
| 6,481,621 | B1 | 11/2002 | Herrendoerfer et al. | |
| 6,481,632 | B2 | 11/2002 | Wentker et al. | |
| 6,483,427 | B1 * | 11/2002 | Werb | 340/10.1 |
| 6,483,477 | B1 * | 11/2002 | Plonka | 343/853 |
| 6,483,929 | B1 | 11/2002 | Murakami | |
| 6,484,937 | B1 | 11/2002 | Devaux et al. | |
| 6,490,443 | B1 | 12/2002 | Freeny, Jr. | |
| 6,491,229 | B1 | 12/2002 | Berney | |
| 6,494,380 | B2 | 12/2002 | Jarosz | |
| 6,507,762 | B1 | 1/2003 | Amro et al. | |
| 6,510,983 | B2 | 1/2003 | Horowitz et al. | |
| 6,510,998 | B1 | 1/2003 | Stanford et al. | |
| 6,513,015 | B2 | 1/2003 | Ogasawara | |
| 6,519,565 | B1 | 2/2003 | Clements et al. | |
| 6,520,542 | B2 | 2/2003 | Thompson et al. | |
| 6,529,880 | B1 | 3/2003 | McKeen et al. | |
| 6,535,726 | B1 | 3/2003 | Johnson | |
| 6,546,373 | B1 | 4/2003 | Cerra | |
| 6,547,133 | B1 | 4/2003 | DeVries, Jr. et al. | |
| 6,549,912 | B1 | 4/2003 | Chen | |
| 6,560,581 | B1 | 5/2003 | Fox et al. | |
| 6,577,229 | B1 | 6/2003 | Bonneau et al. | |
| 6,578,768 | B1 | 6/2003 | Binder et al. | |
| 6,581,839 | B1 | 6/2003 | Lasch et al. | |
| 6,587,835 | B1 * | 7/2003 | Treyz et al. | 705/14 |
| 6,588,660 | B1 | 7/2003 | Buescher et al. | |
| 6,589,119 | B1 | 7/2003 | Orus et al. | |
| 6,598,024 | B1 * | 7/2003 | Walker et al. | 705/16 |
| 6,608,995 | B1 | 8/2003 | Kawasaki et al. | |
| 6,609,655 | B1 | 8/2003 | Harrell | |
| 6,623,039 | B2 | 9/2003 | Thompson et al. | |
| 6,626,356 | B2 | 9/2003 | Davenport et al. | |
| 6,628,961 | B1 | 9/2003 | Ho et al. | |
| 6,629,591 | B1 | 10/2003 | Griswold et al. | |
| 6,636,833 | B1 | 10/2003 | Flitcroft et al. | |

| | | |
|---|---|---|
| 6,650,887 B2 | 11/2003 | McGregor et al. |
| 6,662,166 B2 | 12/2003 | Pare et al. |
| 6,665,405 B1 | 12/2003 | Lenstra |
| 6,669,086 B2 | 12/2003 | Abdi et al. |
| 6,671,358 B1 * | 12/2003 | Seidman et al. ............ 379/93.12 |
| 6,674,786 B1 | 1/2004 | Nakamura et al. |
| 6,679,427 B1 | 1/2004 | Kuroiwa |
| 6,681,328 B1 | 1/2004 | Harris et al. |
| 6,684,269 B2 | 1/2004 | Wagner |
| 6,687,714 B1 | 2/2004 | Kogen et al. |
| 6,690,930 B1 | 2/2004 | Dupre |
| 6,693,513 B2 | 2/2004 | Tuttle |
| 6,703,918 B1 | 3/2004 | Kita |
| 6,705,530 B2 | 3/2004 | Kiekhaefer |
| 6,711,262 B1 | 3/2004 | Watanen |
| 6,732,936 B1 | 5/2004 | Kiekhaefer |
| 6,742,120 B1 | 5/2004 | Markakis et al. |
| 6,747,546 B1 | 6/2004 | Hikita et al. |
| 6,760,581 B2 | 7/2004 | Dutta |
| 6,769,718 B1 | 8/2004 | Warther et al. |
| 6,771,981 B1 | 8/2004 | Zalewski et al. |
| 6,789,012 B1 | 9/2004 | Childs et al. |
| 6,834,270 B1 | 12/2004 | Pagani et al. |
| 6,851,617 B2 | 2/2005 | Saint et al. |
| 6,853,087 B2 | 2/2005 | Neuhaus et al. |
| 6,853,894 B1 | 2/2005 | Kolls |
| 6,853,987 B1 | 2/2005 | Cook |
| 6,857,566 B2 | 2/2005 | Wankmueller |
| 6,859,672 B2 | 2/2005 | Roberts et al. |
| 6,895,310 B1 | 5/2005 | Kolls |
| 6,994,262 B1 | 2/2006 | Warther |
| 7,003,501 B2 | 2/2006 | Ostroff |
| 7,069,444 B2 | 6/2006 | Lowensohn et al. |
| 7,096,204 B1 | 8/2006 | Chen et al. |
| 7,100,821 B2 | 9/2006 | Rasti |
| 7,103,575 B1 | 9/2006 | Linehan |
| 7,136,835 B1 | 11/2006 | Flitcroft et al. |
| 7,213,748 B2 | 5/2007 | Tsuei et al. |
| 2001/0013542 A1 | 8/2001 | Horowitz et al. |
| 2001/0024157 A1 | 9/2001 | Hansmann et al. |
| 2001/0034565 A1 | 10/2001 | Leatherman |
| 2001/0034720 A1 | 10/2001 | Armes |
| 2001/0039617 A1 | 11/2001 | Buhrlen et al. |
| 2001/0049628 A1 | 12/2001 | Icho |
| 2002/0011519 A1 | 1/2002 | Shults |
| 2002/0026419 A1 | 2/2002 | Maritzen et al. |
| 2002/0028704 A1 | 3/2002 | Bloomfield et al. |
| 2002/0035548 A1 | 3/2002 | Hogan et al. |
| 2002/0046341 A1 | 4/2002 | Kazaks et al. |
| 2002/0047049 A1 * | 4/2002 | Perron et al. .................. 235/492 |
| 2002/0052839 A1 | 5/2002 | Takatori |
| 2002/0062284 A1 | 5/2002 | Kawan |
| 2002/0074398 A1 | 6/2002 | Lancos et al. |
| 2002/0077837 A1 | 6/2002 | Krueger et al. |
| 2002/0077895 A1 | 6/2002 | Howell |
| 2002/0077992 A1 | 6/2002 | Tobin |
| 2002/0079367 A1 | 6/2002 | Montani |
| 2002/0092914 A1 | 7/2002 | Pentz et al. |
| 2002/0095298 A1 | 7/2002 | Ewing |
| 2002/0095343 A1 | 7/2002 | Barton et al. |
| 2002/0095389 A1 | 7/2002 | Gaines |
| 2002/0095587 A1 | 7/2002 | Doyle et al. |
| 2002/0097144 A1 | 7/2002 | Collins et al. |
| 2002/0107007 A1 | 8/2002 | Gerson |
| 2002/0107742 A1 | 8/2002 | Magill |
| 2002/0109580 A1 | 8/2002 | Shreve et al. |
| 2002/0111210 A1 | 8/2002 | Luciano, Jr. et al. |
| 2002/0111917 A1 | 8/2002 | Hoffman et al. |
| 2002/0111919 A1 * | 8/2002 | Weller et al. .................. 705/67 |
| 2002/0113082 A1 | 8/2002 | Leatherman et al. |
| 2002/0116274 A1 | 8/2002 | Hind et al. |
| 2002/0120584 A1 | 8/2002 | Hogan et al. |
| 2002/0126010 A1 | 9/2002 | Trimble et al. |
| 2002/0131567 A1 | 9/2002 | Maginas |
| 2002/0138438 A1 | 9/2002 | Bardwell |
| 2002/0140542 A1 | 10/2002 | Prokoski et al. |
| 2002/0145043 A1 | 10/2002 | Challa et al. |
| 2002/0147913 A1 | 10/2002 | Lun Yip |
| 2002/0148892 A1 | 10/2002 | Bardwell |
| 2002/0152123 A1 | 10/2002 | Giordano et al. |
| 2002/0154795 A1 | 10/2002 | Lee et al. |
| 2002/0166891 A1 | 11/2002 | Stoutenburg et al. |
| 2002/0174067 A1 | 11/2002 | Hoffman et al. |
| 2002/0176522 A1 | 11/2002 | Fan |
| 2002/0178063 A1 | 11/2002 | Gravelle et al. |
| 2002/0178369 A1 | 11/2002 | Black |
| 2002/0185543 A1 | 12/2002 | Pentz et al. |
| 2002/0188501 A1 | 12/2002 | Lefkowith |
| 2002/0190125 A1 | 12/2002 | Stockhammer |
| 2002/0194303 A1 | 12/2002 | Stuila et al. |
| 2002/0194503 A1 | 12/2002 | Faith et al. |
| 2002/0196963 A1 | 12/2002 | Bardwell |
| 2003/0009382 A1 | 1/2003 | D'Arbeloff et al. |
| 2003/0014307 A1 | 1/2003 | Heng |
| 2003/0014357 A1 | 1/2003 | Chrisekos et al. |
| 2003/0014891 A1 | 1/2003 | Nelms et al. |
| 2003/0018532 A1 | 1/2003 | Dudek et al. |
| 2003/0018567 A1 | 1/2003 | Flitcroft et al. |
| 2003/0025600 A1 | 2/2003 | Blanchard |
| 2003/0028481 A1 | 2/2003 | Flitcroft et al. |
| 2003/0046228 A1 | 3/2003 | Berney |
| 2003/0054836 A1 | 3/2003 | Michot |
| 2003/0055727 A1 | 3/2003 | Walker et al. |
| 2003/0057226 A1 | 3/2003 | Long |
| 2003/0057278 A1 | 3/2003 | Wong |
| 2003/0058642 A1 | 3/2003 | Chu et al. |
| 2003/0069828 A1 | 4/2003 | Blazey et al. |
| 2003/0069846 A1 | 4/2003 | Marcon |
| 2003/0112972 A1 | 6/2003 | Hattick et al. |
| 2003/0120554 A1 | 6/2003 | Hogan et al. |
| 2003/0121969 A1 | 7/2003 | Wankmueller |
| 2003/0130820 A1 | 7/2003 | Lane, III |
| 2003/0132284 A1 | 7/2003 | Reynolds et al. |
| 2003/0140228 A1 | 7/2003 | Binder |
| 2003/0163699 A1 | 8/2003 | Pailles et al. |
| 2003/0167207 A1 | 9/2003 | Berardi et al. |
| 2003/0177347 A1 | 9/2003 | Schneier et al. |
| 2003/0183689 A1 | 10/2003 | Swift et al. |
| 2003/0183699 A1 | 10/2003 | Masui |
| 2003/0187786 A1 | 10/2003 | Swift et al. |
| 2003/0187787 A1 | 10/2003 | Freund |
| 2003/0187790 A1 | 10/2003 | Swift et al. |
| 2003/0187796 A1 | 10/2003 | Swift et al. |
| 2003/0195037 A1 | 10/2003 | Vuong et al. |
| 2003/0195842 A1 | 10/2003 | Reece |
| 2003/0195843 A1 | 10/2003 | Matsuda et al. |
| 2003/0200184 A1 | 10/2003 | Dominguez et al. |
| 2003/0218066 A1 | 11/2003 | Fernandes et al. |
| 2003/0220876 A1 | 11/2003 | Burger et al. |
| 2003/0222153 A1 | 12/2003 | Pentz et al. |
| 2003/0225623 A1 | 12/2003 | Wankmueller |
| 2003/0225713 A1 | 12/2003 | Atkinson et al. |
| 2003/0227550 A1 | 12/2003 | Manico et al. |
| 2003/0233334 A1 | 12/2003 | Smith |
| 2004/0006539 A1 | 1/2004 | Royer et al. |
| 2004/0010462 A1 | 1/2004 | Moon et al. |
| 2004/0015451 A1 | 1/2004 | Sahota et al. |
| 2004/0016796 A1 | 1/2004 | Hann et al. |
| 2004/0020982 A1 | 2/2004 | Hoffman et al. |
| 2004/0029569 A1 | 2/2004 | Khan et al. |
| 2004/0030601 A1 | 2/2004 | Pond et al. |
| 2004/0039814 A1 | 2/2004 | Crabtree et al. |
| 2004/0039860 A1 | 2/2004 | Mills et al. |
| 2004/0044627 A1 | 3/2004 | Russell et al. |
| 2004/0083184 A1 | 4/2004 | Tsuei et al. |
| 2004/0139021 A1 | 7/2004 | Reed et al. |
| 2005/0017068 A1 | 1/2005 | Zalewski et al. |
| 2005/0038718 A1 | 2/2005 | Barnes et al. |
| 2005/0040272 A1 | 2/2005 | Argumedo et al. |
| 2005/0119978 A1 | 6/2005 | Ates |
| 2005/0121512 A1 | 6/2005 | Wankmueller |

FOREIGN PATENT DOCUMENTS

| | | |
|---|---|---|
| EP | 0 358 525 A2 | 3/1990 |
| EP | 0 424 726 A1 | 10/1990 |
| EP | 0 484 726 A1 | 5/1992 |
| EP | 0 933 717 A2 | 8/1999 |
| EP | 0 956 818 A1 | 11/1999 |

| | | | |
|---|---|---|---|
| EP | 0 959 440 A2 | 11/1999 |
| EP | 0 984 404 A2 | 3/2000 |
| EP | 1 016 947 A2 | 7/2000 |
| EP | 1 039 403 A2 | 9/2000 |
| EP | 1 104 909 A2 | 6/2001 |
| EP | 1 113 387 A2 | 7/2001 |
| EP | 1 115 095 A2 | 7/2001 |
| EP | 1 199 684 A2 | 4/2002 |
| EP | 1 251 450 A1 | 10/2002 |
| GB | 2 347 537 A | 9/2000 |
| GB | 2 361 790 A | 10/2001 |
| JP | 2000-011109 A | 1/2000 |
| JP | 2000015288 A | 1/2000 |
| JP | 2000-040181 A | 2/2000 |
| JP | 2000067312 A | 3/2000 |
| JP | 2000207641 A | 7/2000 |
| JP | 2001-005931 A | 1/2001 |
| JP | 2001283122 A | 10/2001 |
| WO | 95/32919 | 12/1995 |
| WO | 97/09688 A3 | 3/1997 |
| WO | 99/03057 A1 | 1/1999 |
| WO | 99/49424 A1 | 9/1999 |
| WO | 00/10144 A1 | 2/2000 |
| WO | 00/38088 A1 | 6/2000 |
| WO | 00/49586 A1 | 8/2000 |
| WO | 01/04825 A1 | 1/2001 |
| WO | 01/15098 A1 | 3/2001 |
| WO | 01/43095 A2 | 6/2001 |
| WO | 01/72224 A1 | 10/2001 |
| WO | 01/77856 A1 | 10/2001 |
| WO | 01/80473 A2 | 10/2001 |
| WO | 01/86535 A1 | 11/2001 |
| WO | 01/90962 A1 | 11/2001 |
| WO | 01/95243 A2 | 12/2001 |
| WO | 02/01485 A1 | 1/2002 |
| WO | 02/13134 A2 | 2/2002 |
| WO | 02/063545 A2 | 8/2002 |
| WO | 02/065246 A2 | 8/2002 |
| WO | 02/065404 A2 | 8/2002 |
| WO | 02/069221 A1 | 9/2002 |
| WO | 02/073512 A1 | 9/2002 |
| WO | 02/086665 A2 | 10/2002 |
| WO | 02/091281 A2 | 11/2002 |
| WO | 02/097575 A2 | 12/2002 |
| WO | 02/101670 A2 | 12/2002 |
| WO | 03/007623 A3 | 3/2003 |

OTHER PUBLICATIONS

"What's New: Timex Watch Features Speedpass System", http://www.speedpass.com/news/article.jsp?id=51 (1 page).
"Physical Reality: A Second Look", Ken Sharp, Senior Technical Editor, http://www.idsystems.com/reader/1999_03/phys0399_pt2/phys0399_pt2.htm.
"'Magic Wands' to Speed Mobile Sales", Bob Brewin, Jan. 15, 2001, http://www.computerworld.com/mobiletopics/mobile/story/1,10801,563300.html.
"Mobile Speedpass Goes Global as Mobil Singapore Rolls Out Asia's First RFID-Based Pay-At-The-Pump System", Press Release, Apr. 5, 1999, http://www.ti.com/tiris/docs/news_releases/rel12.htm (3 pages).
"Speedpass Unleashed", Jun. 4, 2002 http://www.cardweb.com/cardtrak/news/cf2_20a_97.html (2 pages).
Phophecy Central Update #9, Oct. 10, 1997, http://www.bible.-prophecy.com/pcu9.htm (5 pages).
International Newsletter of the TI RFID Group, Issue 20, 2000 (12 pages).
"CES: Microsoft's SPOT Technology has Humble Origins", by James Niccolai, Jan. 10, 2003, http://archive.inforworld.com/articles/hn/xml/03/01/10/030110hnspot.xml?s=IDGNS (3 pages).
"Microsoft See SPOT Run On Your Wrist", by Richard Shim, Jun. 5, 2003, http://news.com.com/2100-1041_3-1013442.html?tag=fd_top (1 page).
"Networking: Microsoft SPOT", by Jeremy A. Kaplan, Jul. 1, 2003, http://www.pcmag.com/print_article/0,3048,a=43561,00.asp (2 pages).
"Microsoft Launches Smart Personal Object Technology Initiative", Press Release from COMDEX Fall 2002, Nov. 17, 2002, http://www.Microsoft.com/presspass/features/2002/nov02/11-17SPOT.asp (4 pages).
"Bank Extends RFID Payment Pilot: Bank of America will continue to test its QuickWave RFID payment card for another three months", RFID Journal, Jan. 23, 2003.
"MasterCard to Test RFID Card: Pilot will test whether consumers, merchants and credit card issuers value "contactless" payments", RFID Journal, Dec. 20, 2002.
"Vendors Target Amusement Parks: Protecting children and enabling cashless payments make RFID an appealing option for the entertainment industry", RFID Journal, Nov. 27, 2002.
"Inside's Next-Gen Smart Card: The French company plans to introduce an RFID card that uses a 16-bit microprocessor and new encryption technology", RFID Journal, Oct. 29, 2002.
"Sony, Philips Creating RFID Link: Consumer electronics giants are jointly developing a new RFID standard for payments and for communication between devices", RFID Journal, Sep. 17, 2002.
"Japan Gets Digital Ticket System: A national ticket seller and phone company are teaming up to create an electronic-ticket network", RFID Journal, Aug. 21, 2002.
"Security for Wireless Java: NTRU, a startup that offers security software, has released a Java version of its NTRU encryption algorithm", RFID Journal, Jun. 27, 2002.
"Making RFID Payments Ubiquitous: Philips and Visa want people to be able to pay for goods and services anywhere by using RFID chips embedded in phones and other devices", RFID Journal, Jun. 2, 2003.
"RFID Smart Cards Gain Ground: The convenience of contactless transactions is driving widespread adoption of contactless smart cards", RFID Journal, Apr. 9, 2003.
"TI Embraces Prox Card Standard: Texas Instrument's ISO 14443 payment platform promises faster data transfer rates and more security", RFID Journal, Mar. 6, 2003.
"Multiple Frequency Transponders: Volume production of dual-band RFID chips begins", Frontline Solutions, Jul. 16, 2003.
Functional Specification, Standard Card IC MF1 1C S 50, Philips Semiconductors, Product Specification Rev. 5. May 1, 2001.
"Credit Card Offer Travelers New Benefit", PR Newswire, Aug. 5, 1987.
"Fingerprint Analysis—The Basics", http://www.crimtrac.gov.au/fingerprintanalysis.htm, Feb. 18, 2004, 3 pages.
"Fingerprint Technology—Identix Inc.—Empowering Identification™—Understanding Biometrics", http://www.identix.com/newsroom/news_biometrics_finger.html, Feb. 18, 2004, 1 page.
"Identix Inc.—Empowering Identification™—Understanding Biometrics", http://www.identix.com/newsroom/news_biometrics_face.html, 1 page.
"Individual Biometric—Facial Recognition", http://ctl.ncsc.dni.us/biomet%20web/Bmfacial.html, Feb. 18, 2004, 2 pages.
"Individual Biometric—Fingerprint", http://ctl.ncsc.dni.us/biomet%20web/BMFingerprint.html, Feb. 18, 2004, 3 pages.
"Individual Biometric—Hand Geometry", http://ctl.ncsc.dni.us/biomet%20web/BMHand.html, Feb. 18, 2004, 2 pages.
"Individual Biometric—Iris Scan", http://ctl.ncsc.dni.us/biomet%20web/BMIris.html, Feb. 18, 2004, 2 pages.
"Individual Biometric—Retinal Scan", http://ctl.ncsc.dni.us/biomet%20web/BMRetinal.html, Feb. 18, 2004, 2 pages.
"Individual Biometric—Vascular Patterns", http://ctl.ncsc.dni.us/biomet%20web/BMVascular.html, Feb. 18, 2004, 1 page.
"International Biometric Group—Signature Biometrics: How it Works", http://www.ibgweb.com/reports/public/reports/signature-scan_tech.html, Feb. 18, 2004, 1 page.
"International Biometric Group—Voice Recognition Technology: How It Works", http://www.ibgweb.com/reports/public/reports/voice-scan_tech.html, Feb. 18, 2004, 1 page.
"ISO Magnetic Strip Card Standards", http://www.cyberd.co.uk/support/technotes/isocards.htm, Feb. 9, 2004, 4 pages.
"New Evidence about Positive Three-Tier Co-pay Performance Presented at Express Scripts 2000 Outcomes Conference", PR Newswire Association, Inc., Jun. 28, 2000.

"Pay by Touch—Press Releases", http://www.paybytouch.com/press/html, Feb. 10, 2004, 3 pages.

"Paying It by Ear", The Guardian http://money.guardian.co.uk/creditanddebt/creditcards/story/0,1456,876908,00.html, Jan. 18, 2003, 3 pages.

"PowerPay RFID Payment and Marketing Solution Speeds Purchases at Seahawks Stadium with Technology from Texas Instruments", http://www.powerpayit.com/news/Seahawks_pr.html, Feb. 9, 2004, 20 pages.

"Prestige Credit Cards: Those Pricey Plastics", Changing Times, Apr. 1986.

"Shell Introduces Optional Credit Card", The Associated Press, Sep. 3, 1985.

"Shell Introducing Expanded 'Signature' Credit Card", Tulsa Business Chronicle, Sep. 5, 1985.

"Shell-Oil: Introduces Shell Signature Travel and Entertainment Credit Card", Business Wire, Sep. 3, 1985.

"Smart Card Developer's Kit: Some Basic Standards for Smart Card", http://unix.be.eu.org/docs/smart-card-developer-kit/ch03/033-035.html, Feb. 9, 2004, 2 pages.

"The Chase Manhattan Bank Today Announced a Comprehensive Program to Enhance the Value of All its Credit Cards", PR Newswire, Dec. 18, 1986.

"The Henry Classification System", International Biometric Group, 7 pages.

American Express to offer disposable credit card numbers, CNN.com. U.S. News, www.cnn.com/2000/US/09/08/online.payments.ap/, Sep. 8, 2000.

International Search Report and Written Opinion of the International Searching Authority, PCT/US05/26101, May 13, 2008.

Korotkaya, "Biometric Person Authentication: Odor", Department of Information Technology, Laboratory of Applied Mathematics, Lappeenranta University of Technology, 18 pages.

Krakow, "Credit on Your Key Ring, Buy Gas at Mobil, Exxon and Soon Burgers at McDonald's", MSNBC, http://www.msnbc.msn.com/id/3072638, Feb. 17, 2004, 4 pages.

Kulkarni, et al., "Biometrics: Speaker Verification"http://biometrics.cse.msu.edu/speaker.html, Mar. 8, 2004, 5 pages.

Kuntz, Mary, "Credit Cards as Good as Gold", Forbes, Nov. 4, 1985.

Lahey, Liam, "Microsoft Bolsters Rebate Structure", Computer Dealer News, Feb. 8, 2002.

Lamond, "Credit Card Transactions Real World and Online" © 1996.

Luettin, "Visual Speech and Speaker Recognition", http://herensidiap.ch/~luettin/luettin-thesis.bib.abs.html, Jun. 30, 2000, 1 page.

Martin, Zack, One-Time Numbers Stop Web Hackers From Pilfering Data, Card Marketing, Thomson Financial, www.cardforum.com/html/cardmark/jan01_c3.htm, Jan. 2001.

McPerson, "The Evolution of Mobile Payment", Financial Insights, http://www.banktech.com/story/news/showArticle.jhtml?articleID=17601432, Feb. 2, 2004, 2 pages.

Nyman, Judy, "Free Income Tax Clinics are Opening as April 30 Deadline Draws Nearer", The Toronto Star, Final Edition, Mar. 25, 1986.

Obel, Michael, "Oil Companies Push Marketing, Cost Cutting to Fortify Earnings", Oil & Gas Journal, Sep. 16, 1985.

Pay by Touch—Company, http://www.paybytouch.com/company.html.

Roberti, "TI Embraces Prox Card Standard", http://www.ti.com/tiris/docs/news/in_the_news/2003/3-6-03.shtml, Mar. 6, 2003, 2 pages.

Rohde, "Microsoft, IBM and Phillips Test RFID Technology", IDG New Service, http://www.computerweekly.com/Article127889.htm, Feb. 9, 2004, 3 pages.

Ross et al., "Biometrics: Hand Geometry", http://biometrics.cse.msu.msu.edu/hand_geometry.html, Feb. 26, 2004, 2 pages.

Schmuckler, Eric, "Playing Your Cards Right", Forbes, Dec. 28, 1987.

Sony, Philips to Test RFID Platform, RFID Journal, May 8, 2003, 2 pages.

Wilson, "Putting Their Finger on It", http://sanfrancisco.bizjournals.com/sanfrancisco/stories/2003/10/20/story6.html?t=printable, Feb. 9, 2004, 2 pages.

"Core One Credit Union—Discover the Advantage", http://coreone.org/2visa.html, Copyright 2001, (Last Visited Oct. 9, 2002).

"The Bank Credit Card Business", American Bankers Association, 1996, all pages.

American Express, Private Payments SM: A New Level of Security from American Express, American Express Website, Cards.

Bonsor, "How Facial Recognition Systems Work", http://computer.howstuffworks.com/facial-recognition.htm/printable, Feb. 18, 2004, 6 pages.

Bowman, "Everything You Need to Know About Biometrics", Identix Corporation, Jan. 2008, 8 pages.

Carey, Gordon, "Multi-tier Copay", Pharmaceutical Executive, Feb. 2000.

Crumbaugh, Darlene M., "Effective Marketing Positions: Check card as consumer lifeline", Hoosier Banker, Apr. 1998, p. 10, vol. 82, Issue 4.

Disposable Credit Card Numbers, courtesy of CardRatings.org, The Dollar Stretcher, www.stretcher.com/stories/01/010212e.cfm, Jan. 2001.

Docmemory, RFID Takes Priority With Wal-Mart, http://www.simmtester.com/page/news/shownews.asp?num=6650, Feb. 9, 2004, 2 pages.

Evers, "Judge Dismisses FTC Suite Against Rambus", IDG New Service, http://www.infoworld.com/article/04/02/18/HNjudgedismisses_1.html, Feb. 18, 2004, 3 pages.

Gabber, et al., "Agora: A Minimal Distributed Protocol for Electronic Commerce", USENIX Oakland, CA, Nov. 18, 1996.

Goldwasser, Joan, "Best of the Cash-back Cards", Kiplinger's Personal Finance Magazine, Apr. 1999.

Greene, Thomas C., American Express offers temporary CC numbers for the Web, The Register, www.theregister.co.uk/content/1/13132.html, Sep. 9, 2000.

Harris, "How Fingerprint Scanners Work", http://computer.howstuffworks.com/fingerprint-scanner.htm/printable, Feb. 18, 2004, 6 pages.

http://www.palowireless.com/infotooth/tutorial.asp, Apr. 28, 2003.

http://www.palowireless.com/infotooth/tutorial/12cap.asp, Apr. 28, 2003.

http://www.palowireless.com/infotooth/tutorial/baseband.asp, Apr. 28, 2003.

http://www.palowireless.com/infotooth/tutorial/hci.asp, Apr. 28, 2003.

http://www.palowireless.com/infotooth/tutorial/lmp.asp, Apr. 28, 2003.

http://www.palowireless.com/infotooth/tutorial/k1_gap.asp, Apr. 28, 2003.

http://www.palowireless.com/infotooth/tutorial/profiles.asp, Apr. 28, 2003.

http://www.palowireless.com/infotooth/tutorial/radio.asp, Apr. 28, 2003.

http://www.palowireless.com/infotooth/tutorial/rfcomm.asp, Apr. 28, 2003.

http://www.palowireless.com/infotooth/tutorial/sdp.asp, Apr. 28, 2003.

http://www.palowireless.com/infotooth/whatis.asp, Apr. 28, 2003.

http://www.semiconductors.philips.com/news/content/file_878.html, Apr. 7, 2003.

Hurley et al., "Automatic Ear Recognition by Force Field Transformations", The Institution of Electrical Engineers, 2000, pp. 7/1-7/5.

* cited by examiner

SYSTEM AND METHOD FOR SECURING RF TRANSACTIONS USING A RADIO FREQUENCY IDENTIFICATION DEVICE INCLUDING A RANDOM NUMBER GENERATOR

CROSS REFERENCE TO RELATED APPLICATIONS

This invention is a continuation-in-part of, and claims priority to U.S. patent application Ser. No. 10/192,488, entitled "SYSTEM AND METHOD FOR PAYMENT USING RADIO FREQUENCY IDENTIFICATION IN CONTACT AND CONTACTLESS TRANSACTIONS," filed on Jul. 9, 2002 now U.S. Pat. No. 7,239,226 (which itself claims priority to U.S. Provisional Patent Application No. 60/304,216, filed Jul. 10, 2001), and to U.S. patent application Ser. No. 10/340,352, entitled "SYSTEM AND METHOD FOR INCENTING PAYMENT USING RADIO FREQUENCY IDENTIFICATION IN CONTACT AND CONTACTLESS TRANSACTIONS," filed Jan. 10, 2003 (which itself claims priority to U.S. Provisional Patent Application No. 60/396,577, filed Jul. 16, 2002), all of the foregoing applications are incorporated herein by reference. This invention also claims priority to U.S. Provisional Patent Application No. 60/507,893, filed Sep. 30, 2003.

FIELD OF INVENTION

This invention generally relates to a system and method for securing a Radio Frequency (RF) transaction using a RF operable device, and more particularly, to securing a RF transaction using a Radio Frequency Identification (RFID) device including a random number sequencer.

BACKGROUND OF INVENTION

Like barcode and voice data entry, RFID is a contactless information acquisition technology. RFID systems are wireless, and are usually extremely effective in hostile environments where conventional acquisition methods fail. RFID has established itself in a wide range of markets, such as, for example, the high-speed reading of railway containers, tracking moving objects such as livestock or automobiles, and retail inventory applications. As such, RFID technology has become a primary focus in automated data collection, identification and analysis systems worldwide.

Of late, companies are increasingly embodying RFID data acquisition technology in a fob or tag for use in completing financial transactions. A typical fob includes a transponder and is ordinarily a self-contained device which may be contained on any portable form factor. In some instances, a battery may be included with the fob to power the transponder, in which case the internal circuitry of the fob (including the transponder) may draw its operating power from the battery power source. Alternatively, the fob may exist independent of an internal power source. In this instance the internal circuitry of the fob (including the transponder) may gain its operating power directly from an RF interrogation signal. U.S. Pat. No. 5,053,774, issued to Schuermann, describes a typical transponder RF interrogation system which may be found in the prior art. The Schuermann patent describes in general the powering technology surrounding conventional transponder structures. U.S. Pat. No. 4,739,328 discusses a method by which a conventional transponder may respond to a RF interrogation signal. Other typical modulation techniques which may be used include, for example, ISO/IEC 14443 and the like.

In the conventional fob powering technologies used, the fob is typically activated upon presenting the fob in an interrogation signal. In this regard, the fob may be activated irrespective of whether the user desires such activation. Alternatively, the fob may have an internal power source such that interrogation by the reader to activate the fob is not required.

One of the more visible uses of the RFID technology is found in the introduction of Exxon/Mobil's Speedpass® and Shell's EasyPay® products. These products use transponders placed in a fob or tag which enables automatic identification of the user when the fob is presented at a Point of Sale (POS 106) device. Fob identification data is typically passed to a third-party server database, where the identification data is referenced to a customer (e.g., user) credit or debit account. In an exemplary processing method, the server seeks authorization for the transaction by passing the transaction and account data to an authorizing entity, such as for example an "acquirer" or account issuer. Once the server receives authorization from the authorizing entity, the authorizing entity sends clearance to the point of sale device for completion of the transaction.

Minimizing fraud transactions in the RFID environment is typically important to the account issuer to lessen the loss associated with fraudulent RFID transaction device usage. One conventional method for securing RFID transactions involves requiring the device user to provide a secondary form of identification during transaction completion. For example, the RFID transaction device user may be asked to enter a personal identification number (PIN) into a keypad. The PIN may then be verified against a number associated with the user or the RFID transaction device, where the associated number is stored in an account issuer database. If the PIN number provided by the device user matches the associated number, then the transaction may be cleared for completion.

One problem with the conventional method of securing an RFID transaction is that the time for completing the transaction is increased. This is true since the RFID device user must delay the transaction to provide the alternate identification. As can be seen, this defeats one real advantage of the RFID transaction device, which is to permit expedient completion of a transaction.

As such, a need exists for a method of securing RFID transaction which does not increase the time needed to complete a transaction, and which method may be used without device user intervention.

SUMMARY OF INVENTION

Described herein is a system and method for securing RFID transactions which addresses the problems found in conventional transaction securing methods. The securing method described herein includes providing a randomly generated indicia for use in determining whether a device is authorized to complete a transaction request over a system including radio frequency transmission. As such, the invention provides a radio frequency operable transaction device including a transaction device random number generator which may generate a random number in response to a transaction request or RFID reader provided interrogation signal. The transaction device random number may be provided to a transaction device issuer for use in determining whether the transaction device providing transaction account information is an authorized device for use in completing a transaction on the system of the invention. The account issuer may use the random number to locate the appropriate verifying (e.g., "validating") information for confirming the transaction device validity.

During operation, the RFID transaction device may be interrogated by a RFID reader operable to provide a RF interrogation signal for powering a transponder system. The RFID reader may receive an encrypted RFID transaction device identifier, and the transaction device random number from the RFID transaction device and provide the identifier and random number to an authorizing entity, such as an acquirer or an account issuer, for verification. Once the authorizing agent verifies the validity of the transaction device identifier using the random number, the authorizing entity (e.g., account issuer or acquirer) may provide clearance that a transaction may be completed.

In one exemplary embodiment, the RFID transaction device may include an authentication tag which may be provided to the RFID reader along with the random number and the transaction account identifier. The RFID reader may then provide the random number transaction device identifier and authentication tag to the authorizing agent for verification. Once validated, the authorizing agent may provide indication to the merchant point of sale terminal that the transaction may be completed.

In another exemplary embodiment, the RFID reader may additionally be "validated" as being authorized to facilitate transactions with the account issuer. In this instance, the RFID reader may be equipped with a RFID reader authentication tag and a random number generator for generating a RFID reader random number. In this way, once the RFID reader receives the RFID transaction device identifier, the RFID reader may provide the transaction device identifier, RFID reader random number, and reader authentication tag to an authorizing agent, such as an acquirer. The acquirer may then validate that the RFID reader is an authorized reader for facilitating a RF transaction with the account issuer. If the RFID reader authentication tag is validated, the acquirer may then provide the RFID transaction device identifier to an account provider for RFID device verification. The account issuer may then verify that the RFID transaction device is authorized to complete the requested transaction.

In yet another embodiment of the invention, both the RFID reader and the RFID transaction device include an authentication tag. In this embodiment, the RFID transaction device authentication tag and the RFID reader authentication tag may be verified by the account issuer using a transaction device random number and a reader random number, respectively. In this instance the authorizing entity may validate both the transaction device and the reader prior to permitting the requested transaction to be completed.

In still another embodiment of the present invention, the reader authentication tag, the transaction device authentication tag, and the RFID device identifier may be encrypted. In this embodiment, either the RFID transaction device, the RFID reader, or both, include a random number generator for generating a random number to be used to validate the RFID transaction device or the RFID reader. The account issuer may receive the device and reader authentication tags and the device and reader random numbers and use the random numbers to locate the proper decryption keys for decrypting the authentication tags, or encrypted identifiers for validation. Once the information is validated, the account issuer may provide clearance to a merchant system for transaction completion.

These features and other advantages of the system and method, as well as the structure and operation of various exemplary embodiments of the system and method, are described below.

BRIEF DESCRIPTION OF DRAWINGS

The accompanying drawings, wherein like numerals depict like elements, illustrate exemplary embodiments of the present invention, and together with the description, serve to explain the principles of the invention. In the drawings.

DETAILED DESCRIPTION

Figure 1:
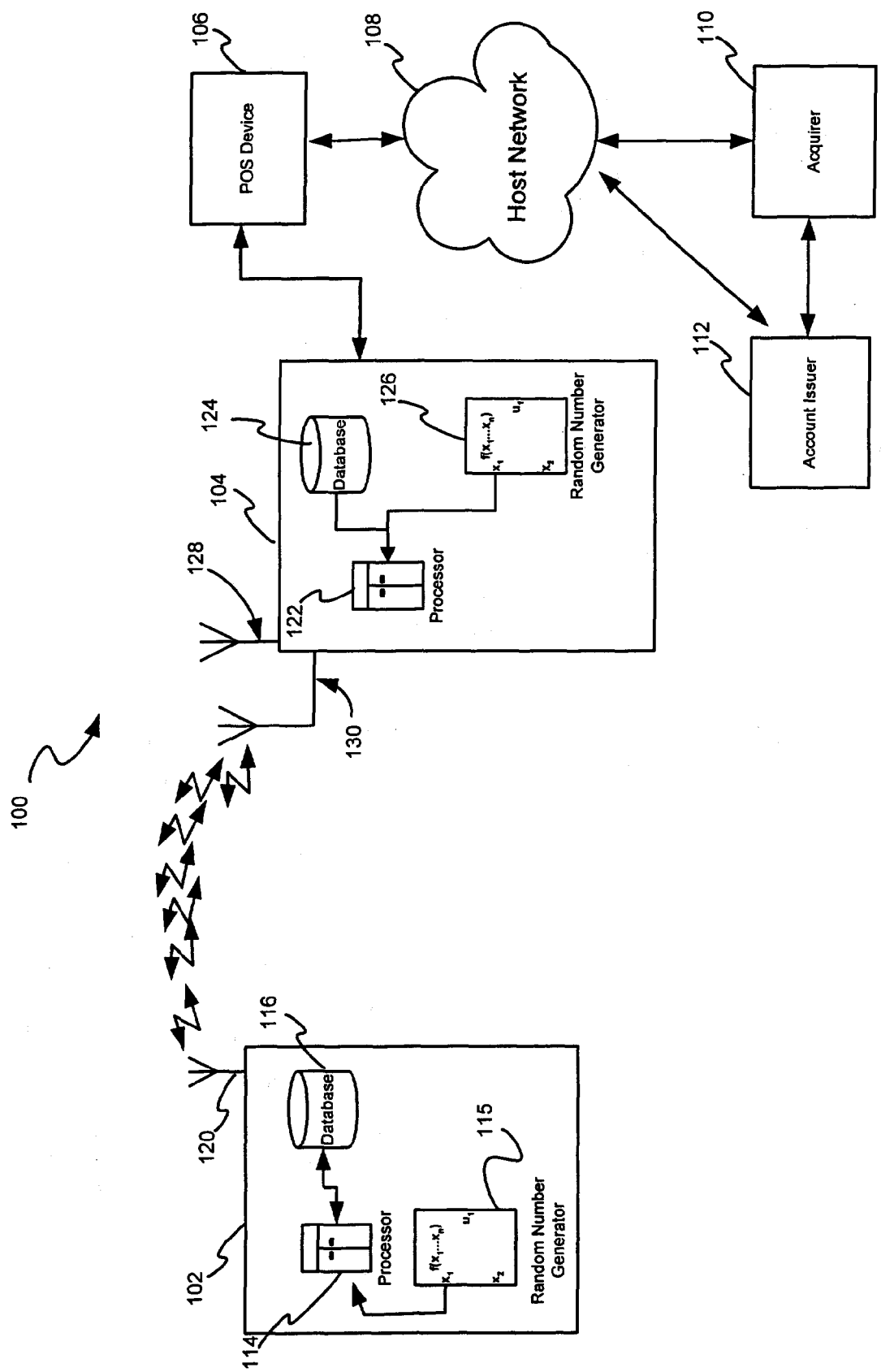
FIG. 1 illustrates an exemplary RFID-based system depicting exemplary components for use in RFID transaction completion in accordance with the present invention.

The present invention may be described herein in terms of functional block components, screen shots, optional selections and various processing steps. Such functional blocks may be realized by any number of hardware and/or software components configured to perform to specified functions. For example, the present invention may employ various integrated circuit components ((e.g., memory elements, processing elements, logic elements, look-up tables, and the like), which may carry out a variety of functions under the control of one or more microprocessors or other control devices. Similarly, the software elements of the present invention may be implemented with any programming or scripting language such as C, C++, Java, COBOL, assembler, PERL, extensible markup language (XML), JavaCard and MULTOS with the various algorithms being implemented with any combination of data structures, objects, processes, routines or other programming elements. Further, it should be noted that the present invention may employ any number of conventional techniques for data transmission, signaling, data processing, network control, and the like. For a basic introduction on cryptography, review a text written by Bruce Schneier entitled "Applied Cryptography: Protocols, Algorithms, and Source Code in C," published by John Wiley & Sons (second edition, 1996), herein incorporated by reference.

In addition, many applications of the present invention could be formulated. The exemplary network disclosed herein may include any system for exchanging data or transacting business, such as the Internet, an intranet, an extranet, WAN, LAN, satellite communications, and/or the like. It is noted that the network may be implemented as other types of networks, such as an interactive television network (ITN).

Further still, the terms "Internet" or "network" may refer to the Internet, any replacement, competitor or successor to the Internet, or any public or private inter-network, intranet or extranet that is based upon open or proprietary protocols. Specific information related to the protocols, standards, and application software utilized in connection with the Internet may not be discussed herein. For further information regarding such details, see, for example, Dilip Naik, "Internet Standards and Protocols" (1998); "Java 2 Complete," various authors, (Sybex 1999); Deborah Ray and Eric Ray, "Mastering HTML 4.0" (1997); Loshin, "TCP/IP Clearly Explained" (1997). All of these texts are hereby incorporated by reference.

By communicating, a signal may travel to/from one component to another. The components may be directly connected to each other or may be connected through one or more other devices or components. The various coupling components for the devices can include but are not limited to the Internet, a wireless network, a conventional wire cable, an optical cable or connection through air, water, or any other medium that conducts signals, and any other coupling device or medium.

Where required, the system user may interact with the system via any input device such as, a keypad, keyboard, mouse, kiosk, personal digital assistant, handheld computer (e.g., Palm Pilot®, Blueberry®), cellular phone and/or the like. Similarly, the invention could be used in conjunction with any type of personal computer, network computer, work station, minicomputer, mainframe, or the like running any operating system such as any version of Windows, Windows NT, Windows 2000, Windows 98, Windows 95, MacOS, OS/2, BeOS, Linux, UNIX, Solaris, or the like. Moreover, although the invention may frequently be described as being implemented with TCP/IP communications protocol, it should be understood that the invention could also be implemented using SNA, IPX, Appletalk, IPte, NetBIOS, OSI or any number of communications protocols. Moreover, the system contemplates, the use, sale, or distribution of any goods, services or information over any network having similar functionality described herein.

A variety of conventional communications media and protocols may be used for data links providing physical connections between the various system components. For example, the data links may be an Internet Service Provider (ISP) configured to facilitate communications over a local loop as is typically used in connection with standard modem communication, cable modem, dish networks, ISDN, Digital Subscriber Lines (DSL), or any wireless communication media. In addition, the merchant system including the POS 106 device 106 and host network 108 may reside on a local area network which interfaces to a remote network (not shown) for remote authorization of an intended transaction. The POS 106 106 may communicate with the remote network via a leased line, such as a T1, D3 line, or the like. Such communications lines are described in a variety of texts, such as, "Understanding Data Communications," by Gilbert Held, which is incorporated herein by reference.

A transaction device identifier, as used herein, may include any identifier for a transaction device which may be correlated to a user transaction account (e.g., credit, charge debit, checking, savings, reward, loyalty, or the like) maintained by a transaction account provider (e.g., payment authorization center). A typical transaction account identifier (e.g., account number) distinct to a transaction device, may be correlated to a credit or debit account, loyalty account, or rewards account maintained and serviced by such entities as American Express, Visa and/or MasterCard or the like.

A transaction device identifier may be, for example, a sixteen-digit credit card number, although each credit provider has its own numbering system, such as the fifteen-digit numbering system used by American Express. Each company's credit card numbers comply with that company's standardized format such that the company using a sixteen-digit format will generally use four spaced sets of numbers, as represented by the number "0000 0000 0000 0000." In a typical example, the first five to seven digits are reserved for processing purposes and identify the issuing bank, card type and, etc. In this example, the last sixteenth digit is used as a sum check for the sixteen-digit number. The intermediary eight-to-ten digits are used to uniquely identify the customer. The account number may be stored as Track 1 and Track 2 data as defined in ISO/IEC 7813, and further may be made unique to the RFID transaction device.

In one exemplary embodiment, the transaction device identifier may include a unique RFID transaction device serial number and user identification number, as well as specific application applets. The transaction device identifier may be stored on a transaction device database located on the transaction device. The transaction device database may be configured to store multiple account numbers issued to the RFID transaction device user by the same or different account providing institutions. In addition, where the device identifier corresponds to a loyalty or rewards account, the RFID transaction device database may be configured to store the attendant loyalty or rewards points data.

In addition to the above, the transaction device identifier may be associated with any secondary form of identification configured to allow the consumer to interact or communicate with a payment system. For example, the transaction device identifier may be associated with, for example, an authorization/access code, personal identification number (PIN), Internet code, digital certificate, biometric data, and/or other secondary identification data used to verify a transaction device user identity.

An authentication tag, as used herein, is any indicia which may be provided for use as a secondary identifier for a device. The authentication tag may be used with or without a transaction card identifier, but is preferably used along with the identifier. The authentication tag may be specific to a particular account provider, such that, multiple devices (e.g., transaction devices, reader, etc.) may contain the same authentication tag.

To facilitate understanding, the present invention may be described with respect to a credit account. However, it should be noted that the invention is not so limited and other accounts permitting an exchange of goods and services for an account data value is contemplated to be within the scope of the present invention.

The databases discussed herein may be any type of database, such as relational, hierarchical, object-oriented, and/or the like. Common database products that may be used to implement the databases include DB2 by IBM (White Plains, N.Y.), any of the database products available from Oracle Corporation (Redwood Shores, Calif.), Microsoft Access or MSSQL by Microsoft Corporation (Redmond, Wash.), or any other database product. Databases may be organized in any suitable manner, including as data tables or lookup tables. Association of certain data may be accomplished through any data association technique known and practiced in the art. For example, the association may be accomplished either manually or automatically. Automatic association techniques may include, for example, a database search, a database merge, GREP, AGREP, SQL, and/or the like. The association step may be accomplished by a database merge function, for example, using a "key field" in each of the manufacturer and retailer data tables. A "key field" partitions the database according to the high-level class of objects defined by the key field. For example, a certain class may be designated as a key field in both the first data table and the second data table, and the two data tables may then be merged on the basis of the class data in the key field. In this embodiment, the data corresponding to the key field in each of the merged data tables is preferably the same. However, data tables having similar, though not identical, data in the key fields may also be merged by using AGREP, for example.

It should be further noted that conventional components of RFID transaction devices may not be discussed herein for brevity. For example, one skilled in the art will appreciate that the RFID transaction device and the RFID reader disclosed herein include traditional transponders, antennas, protocol sequence controllers, modulators/demodulators and the like, necessary for proper RFID data transmission. As such, those components are contemplated to be included in the scope of the invention.

Further still, various components may be described herein in terms of their "validity." In this context, a "valid" component is one which is authorized for use in completing a transaction request in accordance with the present invention. Contrarily, an "invalid" component is one which is not authorized for transaction completion. In addition, an invalid component may be one which is not recognized as being permitted for use on the secure RF system described herein.

Although the present invention is described with respect to validating a transaction device or reader communicating in a RF transaction, the invention is not so limited. The invention, including the random number validation process described herein, may be used for any device, machine, or article, which may be used to transmit RF-based information over a secure RF network.

FIG. 1 illustrates an exemplary secure RFID transaction system 100 in accordance with the present invention, wherein exemplary components for use in completing a RF transaction are depicted. In general, system 100 may include a RFID transaction device 102 in RF communication with a RFID reader 104 for transmitting data there between. The RFID reader 104 may be in further communication with a merchant point of sale (POS) device 106 for providing to the POS 106 data received from the RFID transaction device 102. The POS 106 may be in further communication with an acquirer 110 or an account issuer 112 via a network 108 for transmitting transaction request data and receiving authorization concerning transaction completion.

Although the point of interaction device is described herein with respect to a merchant point of sale device 106, the invention is not to be so limited. Indeed, a merchant POS device is used herein by way of example, and the point of interaction device may be any device capable of receiving transaction device account data. In this regard, the POS 106 may be any point of interaction device enabling the user to complete a transaction using a transaction device 102. The POS device 106 may receive RFID transaction device 102 information and provide the information to host network 108 for processing.

As used herein, an "acquirer" may be a third-party entity including various databases and processors for facilitating the routing of a payment request to an appropriate account issuer 112. The acquirer 110 may route the payment request to the account issuer 112 in accordance with a routing number provided by the RFID transaction device 102, where the routing number corresponds to the account issuer 112. The "routing number" in this context may be a unique network address or any similar device for locating an account issuer 112 on a network 108. In one exemplary embodiment, the routing number may typically be stored in magnetic stripe 100 format on one of the tracks comprising the magstripe network. Traditional means of routing payment request in accordance with the routing number are well understood. As such, the process for using routing number to provide payment request will not be discussed herein for brevity.

In addition, the account issuer 112 ("account provider") may be any entity which provides a transaction account useful for facilitating completion of a transaction request. The transaction account may be identified by an account identifier or account number as described above. The transaction account may be any credit, debit, loyalty, direct debit, checking, or savings, or the like. The term "issuer" or "account provider" may refer to any entity facilitating payment of a transaction using a transaction device, and which may include systems permitting payment using at least one of a preloaded and non-preloaded transaction device 102. Typical issuers may be American Express, MasterCard, Visa, Discover, and the like. In the preloaded value processing context, an exchange value (e.g., money, rewards points, barter points, etc.) may be stored in a preloaded value database (not shown) for use in completing a requested transaction. The preloaded value database and thus the exchange value may not be stored on the transaction device 102 itself, but may be stored remotely, such as for example at the account issuer 112 location. Further, the preloaded value database may be debited the amount of the transaction requiring the value to be replenished. The preloaded value may be any conventional value (e.g., monetary, rewards points, barter points, etc.) which may be exchanged for goods or services. In that regard, the preloaded value may have any configuration as determined by the issuer system 112.

In general, during operation of secure system 100, the RFID reader 104 may provide an interrogation signal to transaction device 102 for powering the device 102 and receiving transaction device related data. The interrogation signal may be received at the transaction device antenna 120 and may be further provided to a transponder (not shown). In response, the transaction device processor 114 may retrieve a transaction device identifier and transaction device authentication code from transaction device database 116 for providing to the RFID reader to complete a transaction request. Typically, the transaction device identifier or the transaction device authentication tag may be encrypted prior to providing the device identifier to a modulator/demodulator (not shown) for providing the identifier and tag to the RFID reader 104.

It should be noted that the RFID reader 104 and the RFID transaction device 102 may engage in mutual authentication prior to transferring any transaction device 102 data to the reader 104. For a detailed explanation of a suitable mutual authentication process for use with the invention, please refer to commonly owned U.S. patent application Ser. No. 10/340,352, entitled "System and Method for Incenting Payment Using Radio Frequency Identification in Contact and Contactless Transactions," filed Jan. 10, 2003, incorporated by reference in its entirety.

In accordance with the present invention, a RF transaction is secured by evaluating the validity of a RFID transaction device 102 using a random number. As described more fully below, an account authorizing agent, such as an account issuer 112 may receive the random number and use the number to locate validating information stored on the account issuer 112 system. The validating information may be any data stored on the account issuer 112 system which may be used to verify that the transaction device and/or the information provided by the transaction device ("transaction device information") are authorized elements which correspond to an authorized transaction account for completing a transaction request.

This method of securing RF transactions using a RFID transaction device 102 is useful where there is a concern that the transaction device information may be pirated during transmission from the device 102 to the RFID reader 104. In some instances, transaction fraud may be committed by stealing the transaction device identifier prior to the identifier being provided to an account issuer 112, thereby permitting the theft to transmit a fraudulent transaction request containing the stolen identifier. The account issuer 112 may receive the fraudulent transaction identifier and determine that the transaction device identifier is valid, which prompts the account issuer 112 to approve the transaction.

However, in accordance with the invention, the validity of the transaction device 102 attempting to complete the transaction may be determined along with determining the validity of the transaction device identifier. This ensures that an authorized device 102 is providing the device 102 identifier information received by the account issuer 112. As noted, to facilitate the recognition of the RFID transaction device 102, the transaction device 102 may be provided an "authentication tag." The authentication tag may be, for example, a digital code or mark appended to the transaction device identifier. Alternatively, the authentication tag may be a stand alone code which is transmitted along with, but distinct from the transaction device identifier. Further still, the authentication tag may be included with, and interspersed among the transaction device identifier or any other information transmitted by the transaction device 102 to RFID reader 104.

In one exemplary embodiment, the authentication tag may be stored in the RFID transaction device database 116. The authentication tag may be provided by the database 116 to the transaction device processor 114 when the transaction device is interrogated by the RFID reader 104.

The account issuer 112 may wish to ensure that the authentication tag has not be pirated in similar manner as was discussed with respect to the transaction device identifier. As such, the account issuer 112 may desire a secondary means of determining authentication tag validity, which may be provided to the account issuer 112 along with the tag information. The account issuer 112 may use the secondary means to verify that the authentication tag is valid by, for example, using the secondary means to locate the corresponding verifying data stored on the account issuer 112 system, which may be used to determine the authentication tag validity.

More particularly, an exemplary embodiment of the present invention uses a random number generated by a RFID transaction device random number generator 115 (or alternatively, the random number is generated by the RFID random number generator 126). Random number generator 115, 126 produces a random number, which may be provided to the account issuer 112 for use in verifying the authentication tag. That is, the account issuer 112 may use the random number to verify that the transaction device 102 providing the device 102 and transaction device information is authorized to complete a transaction request. The account issuer 112 may receive the random number and use a suitable issuer defined algorithm to convert the random number to validating number or case validation. The account issuer 112 may then compare the validating number to validating information stored on an issuer 112 system database. If the validating code correctly corresponds to or matches the validating information, the transaction device 102 is deemed "valid." The transaction device 102 may then be permitted to communicate with the issuer 112 to complete a transaction. Otherwise, if the validating code and validating information do not match, then the transaction device 102 is deemed "invalid" and the transaction is terminated.

It should be noted that the account issuer 112 may alternatively use the random number to verity the validity of the transaction device 102 by using the random number to locate the appropriate data stored on the account issuer 112 system for use in verifying the transaction device 102 identifier or authentication tag. For example, as previously noted, the transaction device 102 identifier and/or the authentication tag are typically encrypted prior to transmission of the identifier to the RFID reader 104. As such, the transaction device 102 identifier or authentication tag are in encrypted form when received by the account issuer 112, requiring the account issuer 112 to locate the proper corresponding decryption key to decrypt the transaction device 102 identifying and authentication tag information. The account issuer 112 may use the random number to locate the corresponding decryption key. For example, the account issuer 112 may subject the random number to an algorithm designed to convert the random number into a data, which may be used to locate the corresponding decryption key. Alternatively, the algorithm may convert the random number into a proper decryption key for use in validating. Once the corresponding decryption key is located, the account issuer 112 may use the decryption key to decrypt the encrypted transaction device 102 identifier or authentication tag and thereby locate the appropriate corresponding transaction account for completion of the transaction.

Further still, as described below, where the account issuer 112 desires to determine the validity of the RFID reader 104 forwarding the transaction device 102 information, the RFID reader 104 may include a RFID reader authentication tag and a RFID reader random number generator 126. In one exemplary embodiment, the account issuer 112 may verify the RFID reader authentication tag using the random number generated by the transaction device random number generator 115. The account issuer 112 may verify the RFID reader 104 authentication tag in similar manner as is discussed above with respect to the verification of the transaction device 102 identifier and authentication tag. That is, the account issuer 112 may receive the random number generated by the random number generator 126 and use the RFID reader random number (or the transaction device random number) to locate the data stored on account issuer 112 system which corresponds to the RFID reader authentication tag for verifying the tag's validity. In this way, the account issuer 112 may verify that the RFID reader 104 is authorized for use in transmitting the RFID transaction device 102 information. Alternatively, the account issuer 112 may receive the random number and convert the random number to validating code which may be used to validate the reader 104 in similar manner as was discussed above with respect to the transaction device 102.

Suitable random number generators for use with the invention may be able to generate a random number or code, such as an alpha numeric code for use by the account issuer 112 to verify the authentication tag's validity. In that regard, the random number generator may be any suitable electronic random number generator as is found in the art.

The validating code, validating information, authentication tag or random number generated by the random number generator 115, 126, may take any format as desired by the account issuer 112. For example, the random number, validating code, validating information or authentication tag may be alpha-numeric, numeric, symbolic, graphical, or the like.

Figure 2:
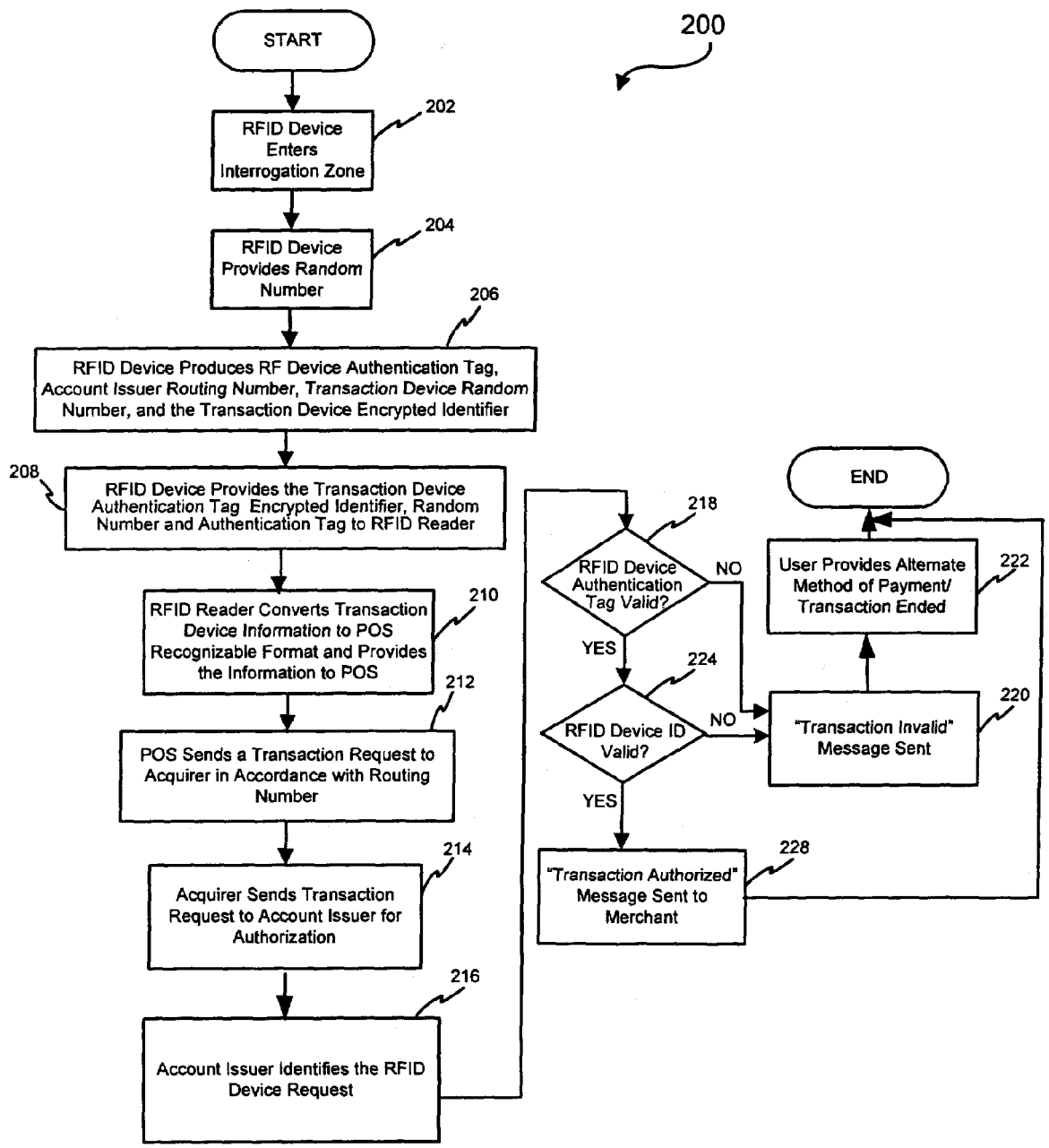
FIG. 2 illustrates an exemplary method for securing a RFID transaction by validating a RFID transaction device using a random number in accordance with the present invention.

A clear understanding of this exemplary embodiment including the transaction device authentication tag and random number may be had with reference to FIG. 1 and FIG. 2. As shown, a secure RF transaction in accordance with this embodiment may begin when the RFID transaction device 102 enters the interrogation zone of the RFID reader 104 and is interrogated (step 202). The RFID transaction device random number generator 115 may produce a transaction device random number (step 204) and the transaction device database 116 may provide a transaction device authentication tag, account issuer routing number, and encrypted transaction device identifier (step 206). The transaction device 102 information, including the device 102 encrypted identifier, the transaction device authentication tag, and the transaction device random number, and the account issuer 112 routing number, may then be provided to the processor 114 for transmitting to the RFID reader 104 via RF transmission (step 208). The transaction device 102 may provide the information to the reader 104 in ISO standardized magnetic stripe format, wherein the information may be transmitted in Track 1/Track 2 configuration.

The RFID reader 104 may receive the transaction device 102 information and convert the information into a POS recognizable format and provide the information to the merchant POS 106 (step 210). The POS 106 may receive the transaction device information and combine the information with information concerning the requested transaction to produce a transaction request. The transaction information may include a product or merchant location identifier, as well as the terms for satisfying the transaction (e.g., price to be paid, barter points to be traded, loyalty points to be redeemed). The POS 106 may then provide the transaction request to an acquirer 110 via a network 108 (step 212).

The acquirer 110 may, in turn, provide the transaction request to the appropriate account issuer 112 for processing (step 214). The acquirer 110 may identify the appropriate account issuer 112 using the routing number provided by the transaction device 102 to locate the network address corresponding to the account issuer 112, thereby permitting the acquirer 110 to provide the transaction request to the account issuer 112 maintaining the corresponding transaction device account.

The account issuer 112 may receive the transaction request and verify whether the RF transaction device authentication tag is valid (step 216). In one exemplary embodiment validating process, the account issuer 112 may use the RFID transaction device random number to locate the corresponding verifying authentication tag to which the provided device authentication tag is compared. For example, the account issuer 112 system may include a processor (not shown) for running an algorithm designed to reconstruct a tag verifying code. The algorithm may be based on any mathematical formula which may be used to convert the random number into a verifying code, which may be used to certify that the authentication tag provided by the transaction device is valid. In one instance, the account issuer 112 may validate the device authentication tag by using the verifying code to locate corresponding authentication tag verification data to which the provided device authentication tag is compared or related. The authentication tag verifying data may be any data which may be used by the account issuer 112 to validate that the transaction device authentication tag, and hence, the device 102 is authorized to complete a transaction on the system 100. In this instance, if the comparison of the provided transaction authentication tag yields a desired or expected result, the tag may be considered authentic and the transaction device 102 may be considered valid. If a desired result is not yielded, the transaction device 102 may be considered invalid.

Alternatively, the account issuer 112 may use an algorithm to reconstruct a verifying code which corresponds to the transaction device authentication tag. In this instance, the verification code may be the authentication tag itself, or may be a code which the user can correlate to the authentication tag using any verifying process as is desired. Additionally, where the authentication tag is encrypted, the verification code may be used to locate the corresponding decryption key. Alternatively, the verification code itself may be the decryption key. If decryption is successfully performed using the decryption key, the account issuer 112 may deem the transaction device 102 is "valid." Otherwise, the transaction device 102 is deemed "invalid." If the authentication tag is invalid (step 218), the account issuer sends a "Transaction Invalid" message to the POS 106, thereby preventing completion of the transaction using the identified transaction device 102 (step 220). The transaction device user may then be permitted to provide an alternate means of satisfying the transaction or the transaction may be ended (step 222).

Alternatively, the account issuer 112 may determine that the authentication tag is valid (step 218). In which case, the account issuer 112 may additionally seek to verify if the validity of encrypted transaction device 102 identifier is valid (step 224). In one exemplary embodiment, the account issuer 112 may verify the validity of the encrypted device identifier by locating a corresponding decryption key with which to decrypt the transaction device identifier. In another exemplary embodiment, the account issuer 112 may use the transaction device 102 random number to locate the appropriate decryption key. The account issuer 112 may convert the random number into a verifying code, as previously described with respect to the transaction device authentication tag. That is, the account issuer 112 may use the random number to construct a validating code which may be used to locate the appropriate decryption key to the encrypted transaction device 102 identifier. Alternatively, the validating code may itself be the decryption key. In either case, the account issuer 112 may use the decryption key to decrypt the transaction account identifier and determine if the decrypted identifier corresponds to a transaction device 102 authorized to complete transactions on the system 100. The account issuer 112 may use the data stored on the account issuer 112 system to make the determination and for authorizing the completion of a transaction.

If the encrypted transaction device identifier is invalid, the account issuer 112 may provide a "Transaction Invalid" message to the POS 106 (step 220) and the transaction device 102 user is permitted to provide an alternate means of satisfying the transaction or the transaction is ended (step 222). Contrariwise, if the account issuer 112 determines that the transaction device identifier is valid (step 224) then the account issuer 112 may provide a "Transaction Valid" message to the POS 106, and the transaction is completed in accordance with the merchant's business as usual protocol (step 228).

In another exemplary embodiment of the secure RF transmission method described herein, the authorizing agent (e.g., account issuer or acquirer) may only seek to verify whether the RFID reader 104 is authorized to receive the transaction device 102 information and provide the information to a merchant POS 106. Account issuer 112 may use a RFID authentication tag and reader random number generator for that purpose. For example, in this instance, the RFID reader 104 may include a database 124 for storing and providing a RFID reader authentication tag, and a reader random number generator 126 for producing a RFID reader random number. The account issuer 112 may receive the RFID reader authentication tag and the random number and verify the validity of the authentication tag in similar manner as is described above with respect to the validation of the transaction device authentication tag. That is, the account issuer 112 may use an algorithm to convert the reader random number to a reader verifying code which may be used to locate a reader authentication verification data to which the account issuer 112 may compare to the provided reader authentication tag.

Alternatively, the verifying code may be, itself, used to verify the reader authentication tag validity. Further still, although the below description discusses validating the RFID reader 104 using a reader random number, it is understood that the account issuer 112 may use a transaction device random number to validate the reader 104 or reader authentication tag.

Figure 3:
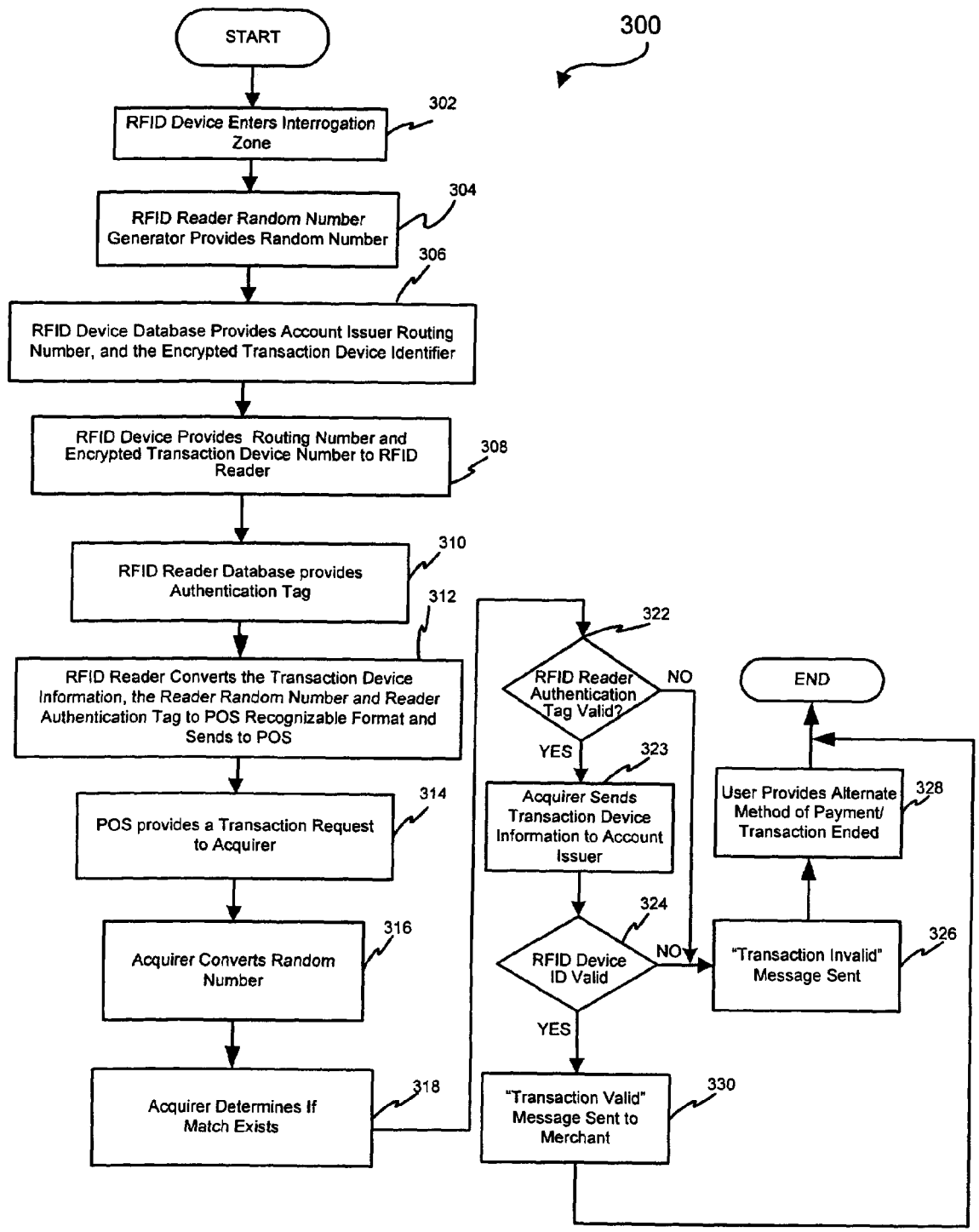
FIG. 3 illustrates an exemplary RF transaction security method for validating a RFID reader using a random number and RFID transaction device authentication tag in accordance with the present invention.

The operation of this embodiment, including the RFID reader authentication tag and reader random number generator 126, may be understood with reference to FIG. 1 and FIG. 3. In similar manner as with FIG. 2, the method exemplified in FIG. 3 may begin with the RFID transaction device 102 entering the interrogation zone and being interrogated by RFID reader 104 (step 302). The RFID transaction device 102 may then provide transaction device information (e.g., encrypted transaction device identifier, account issuer routing number) to the RFID reader 104 (step 306).

The RFID reader 104 may then receive the transaction device information from the transaction device 102 (step 308). The reader database 124 may then provide a RFID reader authentication tag (step 310), and the RFID reader random number generator 126 may generate a reader random number (step 304). The RFID reader 104 may then convert the reader authentication tag, reader random number, and the transaction device information into POS recognizable format and provide the formatted data to the POS 106 (step 312).

The POS 106 may then receive the formatted data from the RFID reader 104 and form a transaction request, including the RFID reader authentication tag, RFID reader random number, and the transaction device information. The POS 106 may then provide the transaction request to an acquirer 110 for determining if the transaction request may be authorized (step 314).

In this exemplary embodiment, the acquirer 110 may verify the validity of the RF reader 104, instead of the RF reader 104 being validated by the account issuer 112. For example, the acquirer 110 may use the reader random number to validate the reader authentication tag. The acquirer 110 may use an algorithm to convert the reader random number to reader verification code which may be used to locate a reader authentication verifying code on an acquirer database (not shown) (step 316). The acquirer 110 may locate the corresponding authentication verifying code and compare the authenticating code to the provided reader authentication code to determine if a match exists or other similar verifying correlation can be made (step 318). Alternatively, the verifying code may be, itself, used to verify the reader authentication tag validity.

If a correlation or match cannot be made with the RFID reader authentication tag (step 322), then the RFID reader 104 is considered invalid for use in conducting a transaction on the system 100, and the acquirer 110 forwards a "Transaction Invalid" message to the POS 106 (step 326). Alternatively, if a correlation or match is made (step 322), the RFID reader 104 is considered valid, and the acquirer 110 forwards the transaction request to an account issuer 112 for validation of the transaction device 102 identifier (step 323) by, for example, locating the proper decryption key. The account issuer 112 may then decrypt the transaction device identifier for validation.

If the transaction device identifier is deemed invalid (step 324), then the account issuer 112 may provide a "Transaction Invalid" message to the POS 106 (step 326), and the device 102 user may be permitted to provide alternate means of satisfying the transaction, or the transaction may be ended (step 328). Otherwise, the account issuer 112 may validate the transaction device 102 (step 324) and send a "Transaction Valid" message to the POS 106 (step 330) and the transaction is completed under business as usual standards.

In yet another exemplary embodiment of the invention, an account issuer 112 may desire to determine whether both the RFID transaction device 102 and the RFID reader 104 are valid for use in completing a transaction on the secure RF transmission system 100. In this instance, both RFID transaction device 102, and RFID reader 104 include a random number generator 115 and 126, respectively. In addition, RFID transaction device database 116 may provide a transaction device authentication tag and RFID reader database 124 may provide a reader authentication tag. As such, an acquirer 110 and/or an account issuer 112 may use the random numbers and the authentication tags to verify the validity of the transaction device 102 and the reader 104 using any validating method as described above.

Figure 4:
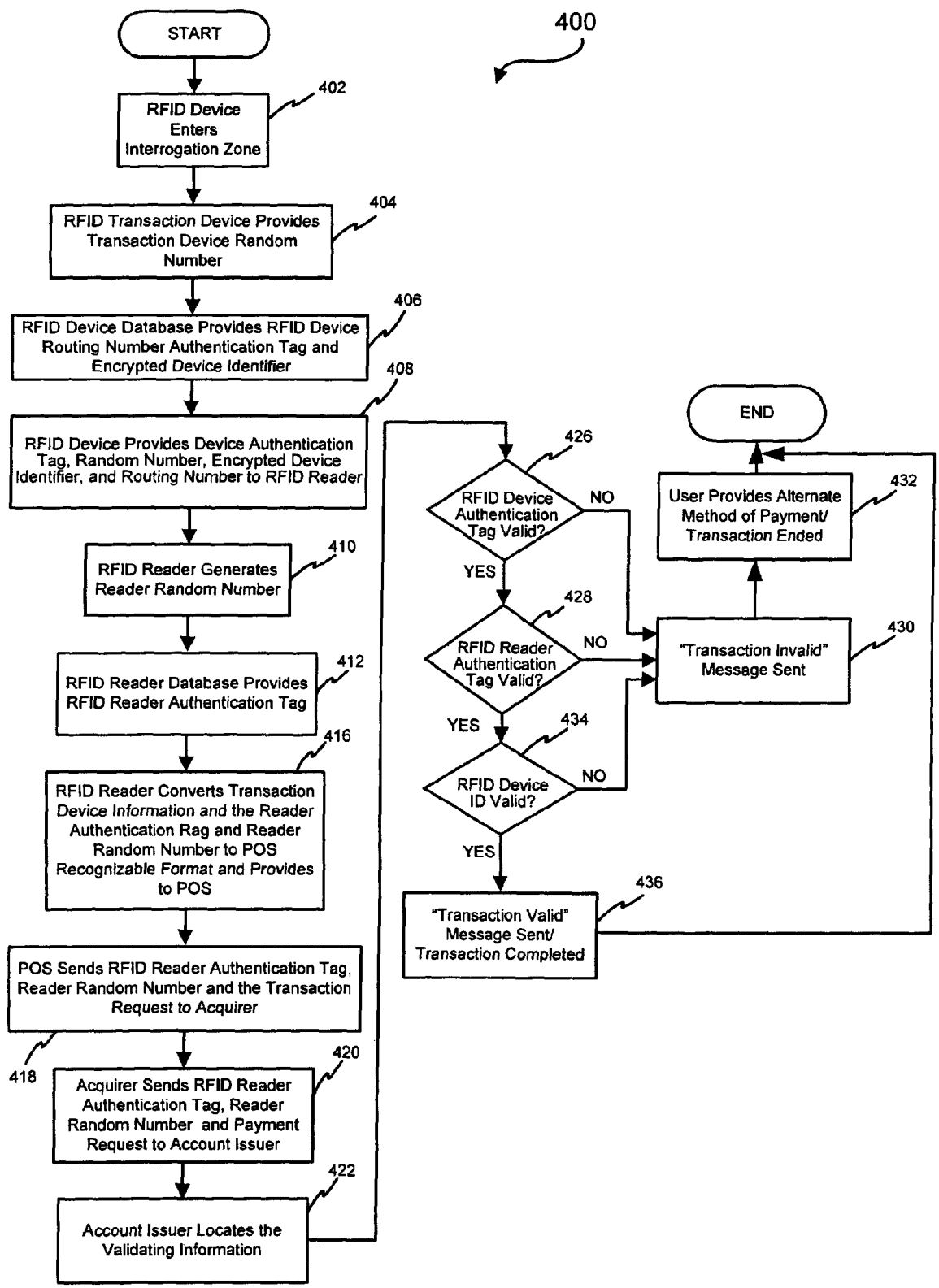
FIG. 4 illustrates an exemplary RF transaction security method for validating a RFID transaction device using a transaction device random number and RFID for validating a RFID reader using a reader transaction device in accordance with the present invention.

With reference to FIG. 4 and continued reference to FIG. 1, the operation of the secure RF transmission system including a reader random number and a transaction device random number may be understood. The operation of this method may begin in similar manner as with the method described with respect to steps 302-310 in FIGURE That is, the transaction device 102 may enter an interrogation zone and be interrogated by the RFID reader 104 (step 402); the transaction device random number generator 115 may generate a transaction device random number and provide the device random number to the device processor 114 (step 404); the transaction device database 116 may provide a routing number, transaction device authentication tag and encrypted transaction device identifier to the processor 114 (step 406); and the processor 114 may provide the transaction device information, including the routing number, RFID transaction device authentication tag, encrypted transaction account identifier, transaction device random number, and transaction device counter total transactions counted value, to the RFID reader 104 via RF transmission (step 408).

Once the RFID reader receives the transaction device information, the RFID reader database 124 provides a RFID reader authentication tag to the RFID reader processor 122 (step 412). In addition, the RFID reader random number generator produces a reader random number and provides the reader random number to the RFID reader processor 122 (step 410). The RFID reader 104 then converts the transaction device information and the RFID reader random number and authentication tag in a POS readable format and provides the converted information to the POS 106 (step 416). The POS 106 may then forward the converted information and any transaction request information to an authorizing agent for validation.

In one exemplary embodiment, the validity of the RFID reader 104 may be verified at the acquirer 110 location in similar manner as was described with respect to FIGURE Alternatively, the present exemplary embodiment describes the RFID reader 104 being validated by the account issuer 112, only by way of illustration.

In accordance with the embodiment illustrated, the POS 106 may provide the converted information to an acquirer 110 (step 418) and the acquirer 110 may provide the converted information to an account issuer 112 for validation (step 420). In this manner, the account issuer 112 may validate the RFID transaction device authentication tag and the RFID reader authentication tag in similar manner as was described with respect to step 220 of FIG. 2 and step 322 of FIG. 3 (steps 426 and 428, respectively).

If the account issuer 112 determines that the RFID device authentication tag or the RFID reader authentication tag are invalid, then the account issuer 112 may provide the POS 106 with a "Transaction Invalid" message, thereby preventing the transaction from being completed (step 430). The transaction device 102 user may then be permitted to provide alternate means for satisfying the transaction, or the transaction may be terminated (step 432). Alternatively, if the transaction device authentication tag and the reader authentication tag are valid, then the account issuer 112 may further seek to determine whether the information provided by transaction device 102 is valid. For example, the account issuer 112 may seek to validate the encrypted transaction device identifier using any method described above (step 434).

Once the RFID transaction device authentication tag, the RFID reader authentication tag and the transaction device identifier are validated the account issuer 112 may provide a "Transaction Valid" message to the POS 106, and the merchant may seek satisfaction of the transaction request under the merchant's business as usual standards.

In accordance with the various embodiments described, the present invention addresses the problem of securing a RF transaction completed by a RFID transaction device. The invention provides a system and method for an account issuer to determine if the RFID transaction device and/or the RFID reader is a valid device for completing a transaction on a RF transaction system. The account issuer can determine whether the reader or transaction device is valid by verifying the reader or device authentication tag and/or encryption code. Similarly, the account issuer may determine the validity of the reader by validating the reader authentication code. It should be noted, however, that the present invention contemplates various arrangements wherein the reader and/or the transaction device may be validated. In addition, the reader and the transaction device may be validated in the same validating process, and each or both may be validated by the acquirer or the account issuer, as desired. In addition, validation of the reader may take place in real-time or under some proscribed ordering.

The preceding detailed description of exemplary embodiments of the invention makes reference to the accompanying drawings, which show the exemplary embodiment by way of illustration. While these exemplary embodiments are described in sufficient detail to enable those skilled in the art to practice the invention, it should be understood that other embodiments may be realized and that logical and mechanical changes may be made without departing from the spirit and scope of the invention. For example, the RFID reader may include an RFID reader encrypted identifier stored in the reader database, which may be validated by the account issuer in similar manner as with the transaction device encrypted identifier. In addition, the steps recited in any of the method or process claims may be executed in any order and are not limited to the order presented or method steps may be added or eliminated as desired. For example, in a particularly exemplary embodiment of the invention the reader may not include an authentication tag, eliminating the need for a step providing a reader authentication tag. Also, the reader may be provided with an encrypted reader identifier, in which case, method steps may be added for verifying the reader identifier. Further, the present invention may be practiced using one or more servers, as necessary. Thus, the preceding detailed description is presented for purposes of illustration only and not of limitation, and the scope of the invention is defined by the preceding description, and with respect to the attached claims.

The invention claimed is:

1. A system for securing a radio frequency (RF) transaction, the system comprising:

a radio frequency identification (RFID) transaction device operable to send an RF transmission, the transaction device including:
 a database for storing a transaction device identifier and a transaction device authentication tag, wherein the transaction device identifier is different from the transaction device authentication tag,
 a transaction device random number generator for generating a transaction device random number, the transaction device random number generator being located at the transaction device, and
 a transmitter operable to transmit the transaction device identifier, the transaction device authentication tag, and the transaction device random number;
wherein the transaction device is operable for transmitting, to a RFID reader, both the transaction device identifier and the transaction device authentication tag for validation, wherein the validation is based at least in part on both the transaction device identifier and the transaction device authentication tag; and
wherein the transaction device random number is used to lookup a previously stored decryption key for decrypting at least one of the transaction device identifier and the transaction device authentication tag, the transaction device random number having been received from the RFID transaction device.

2. The system according to claim 1, further comprising:
a merchant Point of Sale (POS) device in communication with the RFID reader, wherein the RFID reader is in communication with the transaction device; and
an account authorizing agent in communication with the merchant POS.

3. The system according to claim 2, wherein the RFID reader includes:
a reader random number generator for producing a reader random number.

4. The system according to claim 3, wherein the RFID reader further includes:
a processor in communication with the reader random number generator; and
a reader database for storing a RFID reader identifier.

5. The system according to claim 2, wherein the transaction device random number generator is operable to provide the transaction device random number to the RFID reader,
wherein the reader is operable to provide the transaction device random number to the POS, and
wherein the POS is configured to provide the transaction device random number to the account authorizing agent system.

6. The system according to claim 5, wherein the RFID reader is operable to provide the transaction device identifier to the merchant POS.

7. The system according to claim 6, wherein at least one of the transaction device identifier and the transaction device random number is provided to the RFID reader in track 1/track 2 International Standards Setting Organization format.

8. The system according to claim 6, wherein at least one of the transaction device identifier and the transaction device random number is provided to the RFID reader in a POS pre-defined format.

9. The system according to claim 6, wherein the authorizing agent system is configured to validate the transaction device identifier in accordance with the transaction device random number.

10. The system according to claim 4, wherein the RFID reader random number generator is operable to provide the reader random number to the POS, and
wherein the POS is configured to provide at least one of the transaction device random number, transaction device identifier, and reader RFID reader random number to the account authorizing agent system.

11. The system according to claim 10, wherein the RFID reader is operable to provide at least one of the transaction device random number, transaction device identifier, and reader RFID reader random number to the merchant POS.

12. The system according to claim 10, wherein at least one of the transaction device random number, transaction device identifier, and reader RFID reader random number is provided to the RFID reader in track 1/track 2 International Standards Setting Organization format.

13. The system according to claim 10, wherein at least one of the transaction device random number, transaction device identifier, and reader RFID reader random number is provided to the RFID reader in a POS pre-defined format.

14. The system according to claim 10, wherein the authorizing agent system is configured to validate at least one of the transaction device and the RFID reader, in accordance with the at least one of the transaction device random number, transaction device identifier, and reader RFID reader random number transaction device random number.

15. A method for securing a transaction comprising:
generating a transaction device random number at a radio frequency identification (RFID) transaction device, wherein the transaction device includes a random number generator, wherein the transaction device is associated with a transaction device identifier and a transaction device authentication tag, the transaction device identifier being different from the transaction device authentication tag;
transmitting the transaction device identifier, the transaction device authentication tag, and the transaction device random number to a RFID reader; and
validating the transaction device based at least in part on both the transaction device identifier and the transaction device authentication tag, both having been received from the transaction device, wherein the transaction device random number is used to lookup a previously stored decryption key for decrypting at least one of the transaction device identifier and the transaction device authentication tag, the transaction device random number having been received from the transaction device.

16. The method according to claim 15, further comprising:
generating a reader random number, at the RFID reader, using a reader random number generator; and
validating at least one of the transaction device and the RFID reader in accordance with at least one of the transaction device random number and the reader random number.

17. A method for securing a transaction comprising:
generating a transaction device random number at a transaction device, wherein the transaction device includes a random number generator located at the transaction device, wherein the transaction device is associated with a transaction device identifier and a transaction device authentication tag, the transaction device identifier being different from the transaction device authentication tag;
transmitting, from the transaction device, the transaction device identifier, the transaction device authentication tag, and the transaction device random number to a transaction device reader, wherein the transaction device reader is associated with a reader authentication tag;
transmitting, from the transaction device reader, the transaction device identifier, the transaction device authentication tag, the transaction device random number, and the transaction device authentication tag to an account issuer associated with the transaction device;
validating, at the account issuer, the transaction device based at least in part on both the transaction device identifier and the transaction device authentication tag, both having been received from the transaction device, wherein the transaction device random number is used to decrypt at least one of the transaction device identifier and the transaction device authentication tag, wherein the transaction device random number is used to lookup a previously stored decryption key for decrypting at least one of the transaction device identifier and the transaction device authentication tag, the transaction device random number having been received from the transaction device; and
validating, at the account issuer, the transaction device reader based at least in part on the transaction device reader authentication tag, wherein the transaction device random number is used to decrypt the transaction device reader authentication tag.

18. The system according to claim 1, wherein the transaction device random number is converted to a validating code and then used to validate the transaction device.

19. The system according to claim 1, wherein a new transaction device random number is generated for each transaction.

* * * * *